(12) United States Patent
Wang et al.

(10) Patent No.: US 10,467,458 B2
(45) Date of Patent: Nov. 5, 2019

(54) JOINT FACE-DETECTION AND HEAD-POSE-ANGLE-ESTIMATION USING SMALL-SCALE CONVOLUTIONAL NEURAL NETWORK (CNN) MODULES FOR EMBEDDED SYSTEMS

(71) Applicant: AltumView Systems Inc., Burnaby (CA)

(72) Inventors: Xing Wang, Burnaby (CA); Mehdi Seyfi, North Vancouver (CA); Minghua Chen, Coquitlam (CA); Him Wai Ng, Coquitlam (CA); Jie Liang, Coquitlam (CA)

(73) Assignee: AltumView Systems Inc., Port Moody, BC (CA)

( * ) Notice: Subject to any disclaimer, the term of this patent is extended or adjusted under 35 U.S.C. 154(b) by 100 days.

(21) Appl. No.: 15/789,957

(22) Filed: Oct. 20, 2017

(65) Prior Publication Data

US 2019/0026538 A1    Jan. 24, 2019

Related U.S. Application Data

(63) Continuation-in-part of application No. 15/657,109, filed on Jul. 21, 2017, now Pat. No. 10,268,947.

(51) Int. Cl.
*G06K 9/00* (2006.01)
*G06T 7/20* (2017.01)

(52) U.S. Cl.
CPC ..... *G06K 9/00261* (2013.01); *G06K 9/00268* (2013.01); *G06K 9/00288* (2013.01); *G06T 7/20* (2013.01)

(58) Field of Classification Search
CPC .. G06K 9/00261; G06K 9/3233; G06K 9/627; G06K 9/4628; G06K 9/4652;
(Continued)

(56) References Cited

U.S. PATENT DOCUMENTS

| 6,959,109 B2 * | 10/2005 | Moustafa | G06K 9/00241 |
| | | | 340/5.53 |
| 10,204,264 B1 * | 2/2019 | Gallagher | H04N 21/4667 |

(Continued)

*Primary Examiner* — Yon J Couso
(74) *Attorney, Agent, or Firm* — Fang Chen

(57) ABSTRACT

Embodiments described herein provide various examples of a joint face-detection and head-pose-angle-estimation system based on using a small-scale hardware CNN module such as the built-in CNN module in HiSilicon Hi3519 system-on-chip. In some embodiments, the disclosed joint face-detection and head-pose-angle-estimation system is configured to jointly perform multiple tasks of detecting most or all faces in a sequence of video frames, generating pose-angle estimations for the detected faces, tracking detected faces of a same person across the sequence of video frames, and generating "best-pose" estimation for the person being tracked. The disclosed joint face-detection and pose-angle-estimation system can be implemented on resource-limited embedded systems such as smart camera systems that are only integrated with one or more small-scale CNN modules. The proposed system in conjunction with using a subimage-based technique has made it possible to performance multiple face detection and face recognition tasks on high-resolution input images with small-scale low-cost CNN modules.

20 Claims, 20 Drawing Sheets

(58) Field of Classification Search
CPC .............. G06K 9/4642; G06K 9/00228; G06K 9/00288; G06K 9/00268; G06T 7/20
See application file for complete search history.

(56) References Cited

U.S. PATENT DOCUMENTS

| | | | |
|---|---|---|---|
| 2006/0120604 A1* | 6/2006 | Kim | G06K 9/00228 382/181 |
| 2018/0211099 A1* | 7/2018 | Ranjan | G06K 9/00248 |
| 2019/0042833 A1* | 2/2019 | Gernoth | G06K 9/00221 |

* cited by examiner

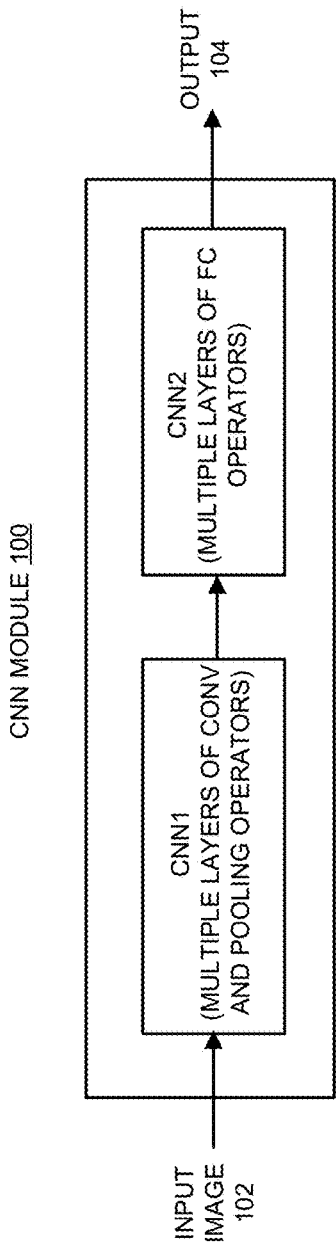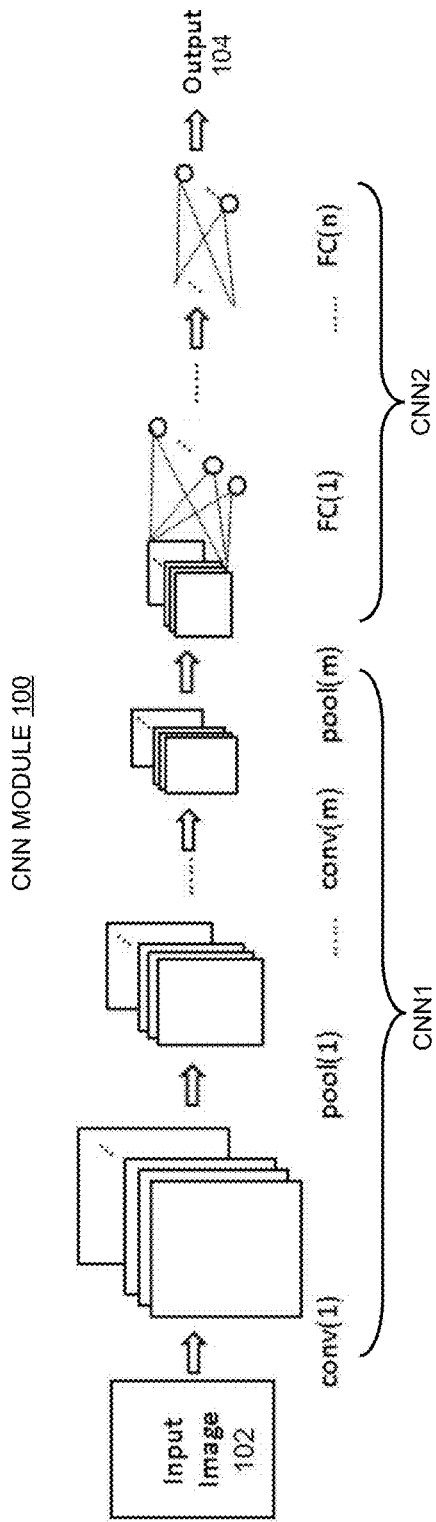
FIG. 1A
FIG. 1B

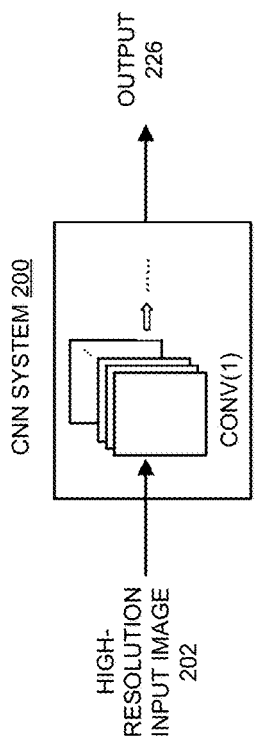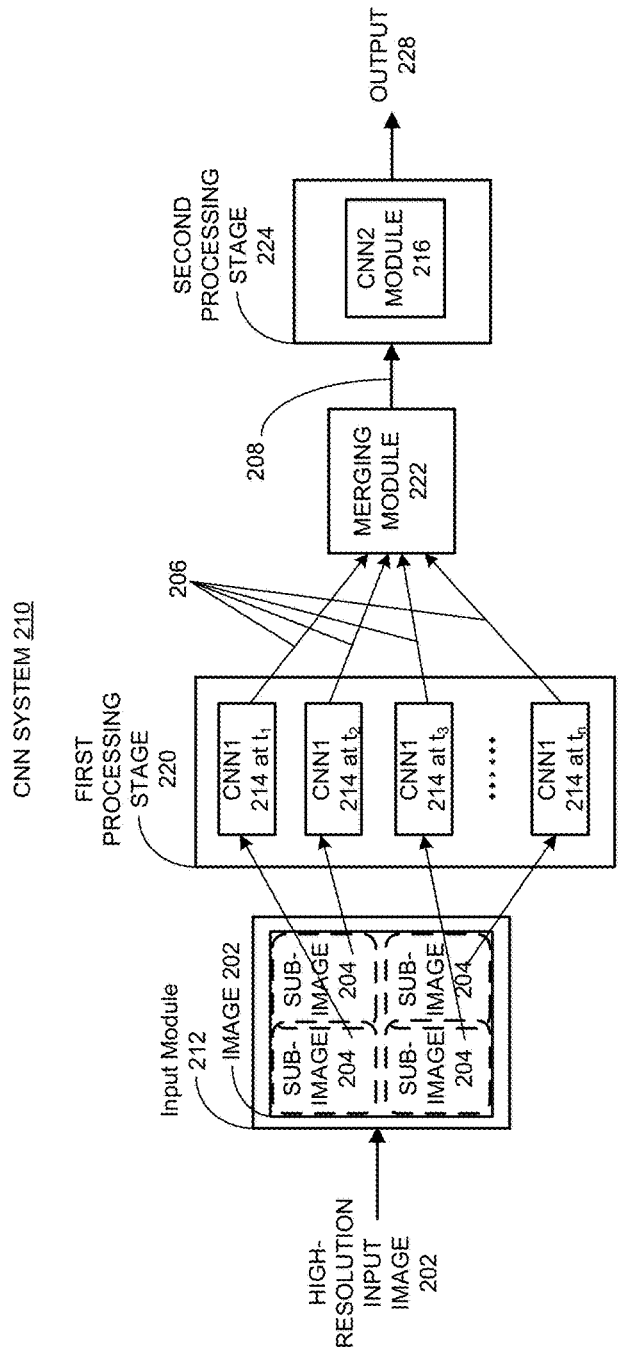

JOINT FACE-DETECTION AND HEAD-POSE-ANGLE-ESTIMATION USING SMALL-SCALE CONVOLUTIONAL NEURAL NETWORK (CNN) MODULES FOR EMBEDDED SYSTEMS

PRIORITY CLAIM AND RELATED PATENT APPLICATIONS

This patent application is a continuation-in-part of, and hereby claims the benefit of priority under 35 U.S.C. § 120 to co-pending U.S. patent application Ser. No. 15/657,109, filed on 21 Jul. 2017, entitled "Face Detection Using Small-scale Convolutional Neural Network (CNN) Modules for Embedded Systems," which in turn claims the benefit of priority under 35 U.S.C. § 119(e) to Provisional Patent Application No. 62/428,497, filed on Nov. 30, 2016, entitled "Convolutional Neural Networks (CNN) Based on Resolution-limited Small-scale CNN Modules," all of the above-listed applications are incorporated herein by reference as a part of this patent document.

This patent application is also related to a pending U.S. patent application entitled, "Convolutional Neural Network (CNN) System Based on Resolution-limited Small-scale CNN Modules," by inventors Xing Wang, Him Wai Ng, Jie Liang, having patent application Ser. No. 15/441,194, and filed on 23 Feb. 2017. The above-listed application is hereby incorporated by reference as a part of this patent document.

TECHNICAL FIELD

The present disclosure generally relates to the field of machine learning and artificial intelligence, and more specifically to systems, devices and techniques for performing a joint face-detection and head-pose-angle-estimation on digital images using a small-scale hardware convolutional neural network (CNN) modules.

BACKGROUND

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Among the existing DL architectures, convolutional neural network (CNN) is one of the most popular DL architectures. Although the idea behind CNN has been known for more than 20 years, the true power of CNN has only been recognized after the recent development of the deep learning theory. To date, CNN has achieved numerous successes in many artificial intelligence and machine learning applications, such as face recognition, image classification, image caption generation, visual question answering, and automatic driving cars.

Face detection, i.e., detecting and locating the position of each face in an image, is usually the first step in many face recognition applications. A large number of face detection techniques can easily detect near frontal faces. However, robust and fast face detection in uncontrolled situations can still be a challenging problem, because such situations are often associated with significant amount of variations of faces, including pose changes, occlusions, exaggerated expressions, and extreme illumination variations. Some effective face detection techniques that can manage such uncontrolled situations include (1) a cascaded convolutional neural networks (CNN) framework described in "A Convolutional Neural Network Cascade for Face Detection," H. Li, Z. Lin, X. Shen, J. Brandt, and G. Hua, Proc. IEEE Conf. on Computer Vision and Pattern Recognition, Jun. 1, 2015 (referred to as "the cascaded CNN" or "the cascaded CNN framework" hereinafter"), and (2) a multitask cascaded CNN framework described in "Joint Face Detection and Alignment Using Multitask Cascaded Convolutional Networks," K. Zhang, Z. Zhang, Z. Li, and Y. Qiao, IEEE Signal Processing Letters, Vol. 23, No. 10, pp. 1499-1503, October 2016 (referred to as "the MTCNN" or "the MTCNN framework" hereinafter).

In the cascaded CNN, a coarse-to-fine cascaded CNN architecture is proposed for face detection. More specifically, instead of using a single deep neural network, the cascaded CNN uses several shallow neural networks operating on different resolutions of the input image, so that the CNN can quickly reject those background regions in the low resolution stages, and then carefully evaluate a small number of candidate regions in the final high resolution stage. To improve localization effectiveness, a calibration stage is used after each detection/classification stage to adjust the detection window (or "the bounding box") position. As a result, the cascaded CNN typically requires six stages and six simple CNNs: three of those for binary face detection/classification, and three more for bounding box calibration. This face detection framework can be highly suitable for implementations in the embedded environments due to the cascade design and the simple CNN used by each stage. Note that, each of the bounding box calibration stages in the cascaded CNN requires an additional CNN and thus extra computational expense. Moreover, in the cascaded CNN, the inherent correlation between face detection and face alignment is ignored.

In the MTCNN, a multi-task cascaded CNN is proposed, which integrates the face detection and face alignment operations using unified cascaded CNNs through a multi-task learning process. In principal, the MTCNN also uses several coarse-to-fine CNN stages to operate on different resolutions of the input image. However, in the MTCNN, facial landmark localization, binary face classification, and bounding box calibration are trained jointly using a single CNN in each stage. As a result, only three stages are needed in the MTCNN. More specifically, the first stage of the MTCNN generates candidate facial windows quickly through a shallow CNN. Next, the second stage of the MTCNN refines the candidate windows by rejecting a large number of non-face windows through a more complex CNN. Finally, the third stage of the MTCNN uses a more powerful CNN to further decide whether each input window is a face or not. If it is determined to be so, the locations of five facial landmarks are also estimated. The performance of the MTCNN is notably improved compared to previous face detection systems. The MTCNN framework is generally more suitable for implementations on resource-limited embedded systems compared to the aforementioned cascaded CNN framework.

In many face detection applications, it is also desirable to estimate the pose of each face because each person's head/face can have different orientations, i.e., different poses in different images, e.g., when a person is constantly moving in a video. Various techniques can be used to estimate the pose of the person's head/face. One example technique is to first estimate the locations of some facial landmarks, such as eyes, nose, and mouth, and then estimate the pose based on these landmark locations. Another technique involves representing the head pose with three Euler angles, i.e., yaw, pitch and roll, and estimating the pose directly with these three angles. The angle-based pose estimation approach typically has a lower complexity than the landmark-based approach because the angle-based approach requires just three values whereas the latter one generally requires more than three landmark coordinates in its estimation.

Face detection on captured video images and pose estimation on the detected faces find usefulness in many embedded system applications. For example, in a surveillance camera system equipped with many cameras, to reduce the transmission bandwidth and the storage cost of the server, it is desirable that each camera only sends the faces in the captured video to the server, instead of sending the entire video. Hence, face detection can be used to generate the face images from video images. Moreover, to avoid sending and storing too many faces of the same person, it is also desirable to keep track of the pose change of each face, and send just the face image corresponding to the "best pose," i.e., the face that is the closest to the frontal view (i.e., with the smallest rotations) of each detected person. Note that it is often beneficial to perform face detection and head-pose-estimation in a joint process, because doing so can reduce the complexity of the overall system.

SUMMARY

Embodiments described herein provide various examples of a joint face-detection and pose-angle-estimation system based on using a small-scale hardware CNN module such as the built-in CNN module in the HiSilicon Hi3519 chipset. In some embodiments, the disclosed joint face-detection and pose-angle-estimation system is configured to jointly perform multiple tasks of detecting most or all faces in a sequence of video frames, generating pose-angle-estimations for the detected faces, tracking detected faces of a same person across the sequence of video frames, and generating "best pose" estimation for the person being tracked. The disclosed joint face-detection and pose-angle-estimation system can be implemented on resource-limited embedded systems such as smart camera systems that are only integrated with one or more small-scale CNN modules.

In some embodiment, the disclosed joint face-detection and pose-angle-estimation system uses a coarse-to-fine multi-stage MTCNN architecture, and each of the stages can be implemented with a small-scale CNN module. Moreover, in those stages where the input-face-image sizes violate the input-size constraint of the small-scale CNN module (e.g., the last stage in a coarse-to-fine three-stage MTCNN), the disclosed joint face-detection and pose-angle-estimation system is configured to use a subimage-based technique on those input face images having sizes greater than the maximum input image size supported by the small-scale CNN module.

In some embodiments, using this subimage-based technique in a given stage of the multi-stage MTCNN (e.g., the last stage in a three-stage MTCNN), the disclosed joint face-detection and pose-angle-estimation system can first divide a high-resolution input face image into a set of properly sized subimages with judiciously designed overlaps among neighbouring subimages. Each of the subimages can then be processed with a resource-limited small-scale CNN module, such as the built-in CNN module in Hi3519. The outputs corresponding to the set of subimages can be subsequently merged to obtain the output corresponding to the high-resolution input face image, and the merged output can be further processed by subsequent layers in the given stage of the multi-stage MTCNN. In some embodiments, the given stage using the subimage-based technique can be configured to be equivalent to a corresponding stage in the MTCNN which uses a large-scale CNN to process the entire high-resolution input face image without partitioning, and as such the output of the given stage using the subimage-based technique can be exactly identical to the output of the corresponding stage that does not use the subimage-based technique.

In one aspect, a process for performing joint face-detection and head-pose-estimation on video images based on using at least one small-scale convolutional neural network (CNN) module having a maximum input size constraint is disclosed. This process includes the steps of: receiving a video image among a sequence of video frames; detecting a candidate face image patch within the video image, wherein the candidate face image patch has a first image size larger than the maximum input size of the small-scale CNN module; partitioning the candidate face image patch into a set of subimages of a second image size smaller than the maximum input size of the small-scale CNN module; processing the set of subimages using the small-scale CNN module to generate a set of outputs corresponding to the set of subimages; merging the set of outputs into a combined output corresponding to the detected candidate face image patch; and processing the combined output to generate a face classifier and a set of head-pose estimations for the detected candidate face image patch if the detected candidate face image patch is classified as a human face based on the face classifier.

In some implementations, prior to partitioning the candidate face image patch into a set of subimages, the process further includes resizing the candidate face image patch into a third image size greater than the maximum input size of the small-scale CNN module, wherein the third image size satisfies a predetermined condition for image partition. Hence, partitioning the candidate face image patch includes partitioning the resized candidate face image patch into the set of subimages of the second image size.

In some implementations, the process resizes the candidate face image patch into the third image size by determining if the first image size is greater than the third image size. If so, the process downsamples the candidate face image patch to the third image size. Otherwise, the process upsamples the candidate face image patch to the third image size.

In some implementations, the set of head-pose estimations includes three head-pose angles associated with the detected human face. Moreover, each of the estimated head-pose angles is between −90° and 90°, and a full frontal face has all of the three head-pose angles of 0°.

In some implementations, the process further includes the steps of: detecting a set of face images of a unique person across the sequence of video frames; generating a set of head-pose estimations for each of the set of detected face images of the unique person; selecting a best pose based on the sets of head-pose estimations which represents a head pose associated with the smallest overall rotation from a full frontal orientation of a head; and transmitting the detected face image associated with the selected best pose of the unique person to a server.

In some implementations, the process selects the best pose based on the sets of head-pose estimations by first computing a sum of the absolute values of the three head-pose angles for each set of the head-pose estimations; and then selecting the best pose among the set of detected face images corresponding to the minimum computed sum.

In some implementations, the process further includes tracking the detected faces of the unique person across the sequence of video frames.

In some implementations, an output within the set of outputs is a set of feature maps corresponding to a subimage in the set of subimages, and the combined output includes a merged feature map of sets of features maps corresponding to the set of subimages In some implementations, the merged feature map corresponding to the set of subimages is identical to a full feature map generated by a large-scale CNN module by processing the candidate face image patch as a whole without partitioning.

In some implementations, the process generates the face classifier and the set of head-pose estimations by using two or more fully-connected layers.

In another aspect, a joint face-detection and head-pose-estimation system using at least one small-scale CNN module having a maximum input size constraint is disclosed. This system includes an input module configured to receive a video image among a sequence of video frames. The system also includes a small-scale CNN module coupled to the input module and configured to: detect a candidate face image patch within the video image, wherein the candidate face image patch has a first image size larger than the maximum input size of the small-scale CNN module; partition the candidate face image patch into a set of subimages of a second image size smaller than the maximum input size of the small-scale CNN module; and process the set of subimages to generate a set of outputs corresponding to the set of subimages. The system additionally includes a merging module coupled to the small-scale CNN module and configured to merge the set of outputs into a combined output corresponding to the detected candidate face image patch. The system further includes a prediction module coupled to the merging module and configured to process the combined output to generate a face classifier and a set of head-pose estimations for the detected candidate face image patch if the detected candidate face image patch is classified as a human face based on the face classifier.

In some implementations, the set of head-pose estimations includes three head-pose angles associated with the detected human face. Each of the estimated head-pose angles is between −90° and 90°, and a full frontal face has all of the three head-pose angles of 0°.

In some implementations, the disclosed system is further configured to: detect a set of face images of a unique person across the sequence of video frames; generate a set of head-pose estimations for each of the set of detected face images of the unique person; select a best pose based on the sets of head-pose estimations which represents a head pose associated with the smallest overall rotation from a full frontal orientation of a head; and transmit the detected face image associated with the selected best pose of the unique person to a server.

In some implementations, the system is configured to select the best pose by: computing a sum of the absolute values of the three head-pose angles for each set of the head-pose estimations; and selecting the best pose among the set of detected face images corresponding to the minimum computed sum.

In some implementations, the system further includes a tracking module coupled to the small-scale CNN module and configured to track the detected faces of the unique person across the sequence of video frames.

In some implementations, the small-scale CNN module is a hardware CNN module embedded within a chipset or a system on chip (SoC), such as HiSilicon Hi3519 SoC.

In yet another aspect, an embedded system capable of performing joint face-detection and head-pose-estimation on video images is disclosed. This embedded system includes: a processor; a memory coupled to the processor; an image capturing device coupled to the processor and the memory and configured to capture a sequence of video frames; and a joint face-detection and head-pose-estimation subsystem coupled to the image capturing device and including a small-scale CNN module associated with a maximum input size constraint. In some embodiments, this joint face-detection and head-pose-estimation subsystem is configured to: receive a video image among the sequence of video frames; detect a candidate face image patch within the video image, wherein the candidate face image patch has a first image size larger than the maximum input size of the small-scale CNN module; partition the candidate face image patch into a set of subimages of a second image size smaller than the maximum input size of the small-scale CNN module; process the set of subimages using the small-scale CNN module to generate a set of outputs corresponding to the set of subimages; merge the set of outputs into a combined output corresponding to the detected candidate face image patch; and process the combined output to generate a face classifier and a set of head-pose estimations for the detected candidate face image patch if the detected candidate face image patch is classified as a human face based on the face classifier.

BRIEF DESCRIPTION OF THE DRAWINGS

The structure and operation of the present disclosure will be understood from a review of the following detailed description and the accompanying drawings in which like reference numerals refer to like parts and in which:

FIG. 1A shows a block diagram of a small-scale hardware CNN module for processing a low-resolution input image.

FIG. 1B shows a more detailed implementation of the hardware CNN module in FIG. 1A.

FIG. 2A shows a block diagram of a conventional full-image-based CNN system for processing higher-resolution input images.

FIG. 2B shows a block diagram of a subimage-based CNN system.

DETAILED DESCRIPTION

Figure 3:
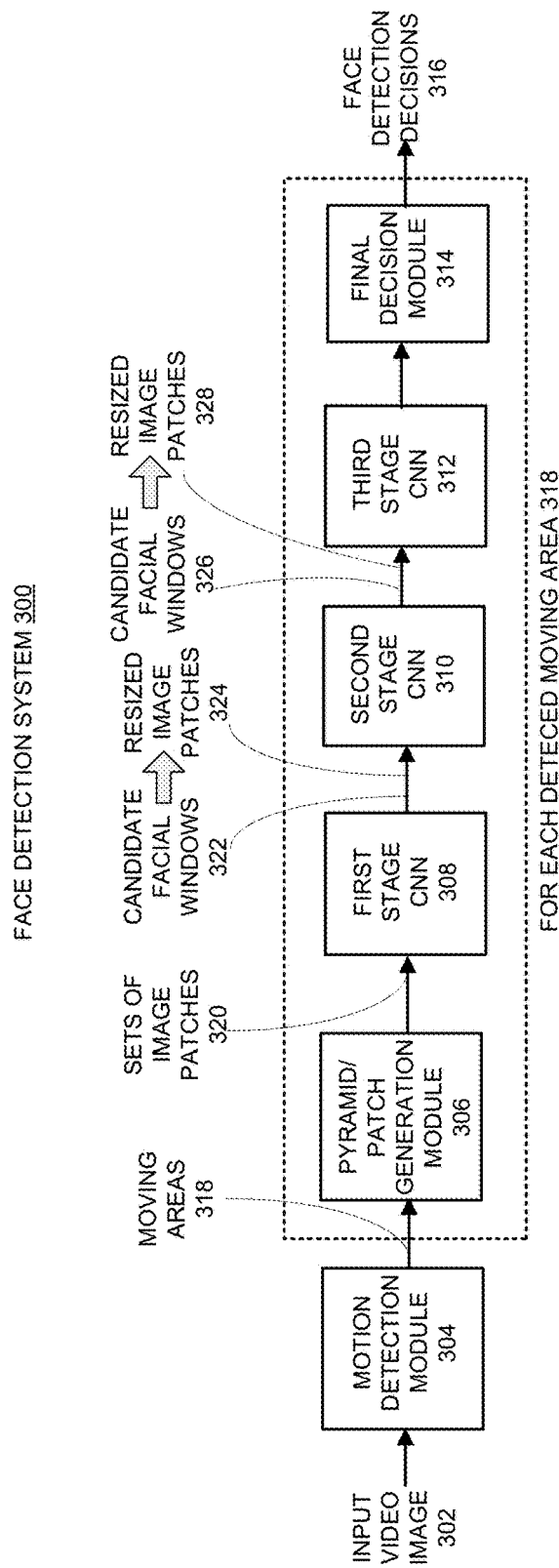
FIG. 3 shows a block diagram of an exemplary face detection system based on a small-scale hardware CNN module in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Throughout the specification, the following terms have the meanings provided herein, unless the context clearly dictates otherwise. The terms "image resolution" and "image size" are used interchangeably to mean the number of pixels within a given two-dimensional (2D) image. The terms "head pose," "face pose," and "pose" are used interchangeably to mean the specific orientation of a person's head within an image.

In this patent disclosure, various examples of a face detection system, technique and architecture based on using a small-scale low-cost CNN module configured into a multi-task cascaded CNN are described. In some embodiments, the small-scale low-cost CNN module is embedded within a chipset or a system on chip (SoC). Hence, the proposed face detection system, technique and architecture can be implemented on a chipset or a SoC that includes such a small-scale low-cost CNN module. In a particular example, the proposed face detection system, technique and architecture can be implemented on a HiSilicon Hi3519 SoC (or "Hi3519," "Hi3519 SoC" hereinafter) developed for smart cameras by HiSilicon Semiconductor Co. Ltd., a subsidiary of Huawei Technologies Co. Ltd. Notably, Hi3519 SoC includes both a build-in hardware CNN module and a CPU that can execute some simple software CNN functions.

This patent disclosure additionally provides various examples of a joint face-detection and pose-angle-estimation system based on using a small-scale hardware CNN module such as the built-in CNN module in Hi3519. In some embodiments, the disclosed joint face-detection and pose-angle-estimation system is configured to jointly perform multiple tasks of detecting most or all faces in video frames, generating pose-angle estimations for the detected faces, tracking detected faces of a same person, and generating "best pose" estimation for the person being tracked. The disclosed joint face-detection and pose-angle-estimation system can be implemented on resource-limited embedded systems such as smart camera systems that are only integrated with one or more small-scale CNN modules.

In some embodiment, the disclosed joint face-detection and pose-angle-estimation system uses a coarse-to-fine multi-stage MTCNN architecture, and each of the stages can be implemented with a small-scale CNN module. Moreover, in those stages where the input face image sizes violate the input-size constraint of the small-scale CNN module (e.g., the last stage in a coarse-to-fine three-stage MTCNN), the disclosed joint face-detection and pose-angle-estimation system is configured to use a subimage-based technique on those input face images having sizes greater than the maximum input image size supported by the small-scale CNN module.

In some embodiments, using this subimage-based technique in a given stage of the multi-stage MTCNN (e.g., the last stage in a three-stage MTCNN), the disclosed joint face-detection and pose-angle-estimation system can first divide a high-resolution input face image into a set of properly sized subimages with judiciously designed overlaps among neighbouring subimages. Each of the subimages can then be processed with a resource-limited small-scale CNN module, such as the built-in CNN module in Hi3519. The outputs corresponding to the set of subimages can be subsequently merged to obtain the output corresponding to the high-resolution input face image, and the merged output can be further processed by subsequent layers in the given stage of the multi-stage MTCNN. In some embodiments, the given stage using the subimage-based technique can be configured to be equivalent to a corresponding stage in the MTCNN which uses a large-scale CNN to process the entire high-resolution input face image without partitioning, and as such the output of the given stage using the subimage-based technique can be exactly identical to the output of the corresponding stage that does not use the subimage-based technique.

Most existing CNN-based DL architectures and systems are not cost-effective for many embedded system applications. Meanwhile, some low-cost CNN-enabled embedded systems based on low-cost chipsets have started to emerge. One notable example is the Hi3519 SoC. The cost of Hi3519 SoC is significantly lower than Nvidia™ TK1/TX1 chipsets. Hi3519 SoC also includes a built-in hardware CNN module with many promising features. For example, the parameters of the built-in CNN module in Hi3519 SoC are reconfigurable, i.e., users can modify the network architecture and the parameters, which can be pre-trained for different applications. Moreover, this built-in CNN module is quite fast.

Designed to reduce cost, these small-scale low-cost CNN modules, such as Hi3519 SoC often have limited capability and a number of constraints. For example, in Hi3519 SoC, the maximum number of pixels in the input image for the embedded CNN module is 1280. However, in the above-described MTCNN framework, the input image sizes increase rapidly from one stage to the next in the coarse-to-fine architecture. For example, in some implementations of the MTCNN, the input image size to the second stage can be 24×24×3=1728, and the input image size to the third stage can be 48×48×3=6912. Both of these input sizes exceed the input size limit of the embedded CNN module within Hi3519 SoC. To implement the MTCNN on Hi3519 SoC, one may modify the MTCNN to use smaller input image sizes and downsample the input videos accordingly. However, in doing so, the quality of the faces in the videos will be significantly degraded, and as a result the face detection performance will suffer greatly.

Related patent application Ser. No. 15/441,194, the content of which is incorporated by reference herein, provides a solution to the above-described problems of implementing the MTCNN on a small-scale low-cost CNN module, such as Hi3519 SoC. To solve the problem that an input image size is greater than the maximum input size of a CNN module, the related patent application provides various embodiments of a subimage-based CNN system which first divides a larger input image into a set of smaller subimages, while including judiciously designed overlaps among neighboring subimages. Each of the subimages can then be processed by a small-scale hardware CNN module, such as the built-in CNN module in Hi3519 SoC. The outputs corresponding to the set of subimages can then be merged, and the merged result can be further processed by the next stage. The subimage-based CNN system described in the related patent application can be configured to be equivalent to a large-scale CNN that processes the entire input image without partitioning such that the output of the subimage-based CNN system can be exactly identical to the output of the large-scale CNN. Based on this observation, some embodiments of this patent disclosure make use of the subimage-based CNN system and technique on one or more stages of the cascaded CNN or the MTCNN so that a larger input image to a given stage of the cascaded CNN or the MTCNN can be partitioned into a set of subimages of a smaller size. As a result, each stage of the cascaded CNN or the MTCNN can use the same small-scale hardware CNN module that is associated with a maximum input image size constraint.

In some embodiments, to improve real-time face detection performance, the proposed face detection technique and system detects those moving areas in each of the video frames/images. For example, the proposed face detection technique and system can use a built-in background subtraction module of Hi3519 to detect those moving areas in the video frame. Next, the proposed face detection technique and system uses a coarse-to-fine multi-stage CNN to detect most or all faces in the video frame. More specifically, for each stage in the multi-stage CNN which has an input image size constraint, the subimage-based CNN framework can be applied. For example, some embodiments of the proposed face detection technique only need to apply the subimage-based CNN framework to the last stage of a multi-stage CNN framework.

In some embodiments, to improve real-time face detection efficiency, the proposed face detection technique and system can also identify the facial landmark points of each detected face (such as eyes, noses, and mouths). This information allows the system to track each face, select the best-pose image (also referred to as "the best face") of each person, e.g., the one that is closest to the front-view, and send the best face to the server for further processing, such as face retrieval. By transmitting the faces in the video frame, it is not necessary to transmit the entire video frame to the server for some applications, thereby reducing the requirements of the network bandwidth and computational resource of the server. The saving can be especially significant for systems which are equipped with a large number of cameras to simultaneously capture multiple channels of video signals in their applications.

In the following discussion, we may use the built-in hardware CNN module within Hi3519 SoC as an example to illustrate some exemplary implementations of the proposed face detection CNN system and technique. However, it should be noted that the proposed face detection CNN system and technique are not limited to a particular chipset or SoC, such as Hi3519 SoC. The disclosed face detection system and technique of using small-scale hardware CNN modules to replace larger, more complex CNN modules in some or all stages of the cascaded CNN or the MTCNN can be applied to any small-scale hardware CNN modules or any chipset or SoC that includes embedded small-scale hardware CNN modules. Moreover, the disclosed face detection system and technique can be implemented as a single field programmable gate array (FPGA) module, and integrated within an embedded platform.

Summary of the Related Subimage-Based CNN Framework

The subimage-based CNN system described in the related patent application Ser. No. 15/441,194 is constructed based on small-scale low-cost hardware CNN modules. This subimage-based CNN system can be implemented in resource-limited systems, such as embedded systems and mobile devices, to allow these systems to perform tasks which would typically require large-scale, high-complexity expensive CNN systems. This subimage-based CNN system can also be implemented in existing DL systems to replace large-scale, high-complexity CNN modules to significantly reduce system cost. For example, this subimage-based CNN system allows for using low-cost CNN-enabled embedded systems on high-complexity CNN applications, such as processing high-resolution input images which would otherwise not be feasible for resource-limited embedded systems. In some embodiments, the subimage-based CNN system reuses one or more small-scale hardware CNN modules which are designed to process input images of lower resolutions, such as the built-in hardware CNN module within Hi3519 SoC, so that the subimage-based CNN system can be applied to higher-resolution input images and more challenging tasks which typically require the processing power of expensive and large-scale hardware CNN modules.

The subimage-based CNN system is a tiered system which is configured to manage a complex task based on a divide-and-conquer approach. In some embodiments described in the related patent application, the subimage-based CNN system is constructed with two or more stages, wherein each of the two or more stages is implemented with either one or more small-scale low-cost hardware CNN modules or with software which operates on low-resolution inputs. As such, each of the two or more stages can have a very low-complexity. More specifically, to use the subimage-based CNN system, an original high-resolution input image can be partitioned into a set of subimages of the same size which is much smaller than the size of the original input image, wherein the partition can include properly designed overlaps among adjacent subimages. These subimages are fed into the first stage of the subimage-based CNN system which includes at least one small-scale low-cost hardware CNN module designed to handle low-resolution input images, and the outputs from the first stage of the processed set of subimages are subsequently merged. More specifically, the set of subimages can be processed by reusing the one or more small-scale hardware CNN modules repeatedly on the set of subimages. In this manner, a high-resolution input image can be processed by the one or more small-scale hardware CNN modules by way of reusing the one or more small-scale hardware CNN modules on the set of subimages.

The outputs from the first stage based on the set of subimages are subsequently merged. In some embodiments, the subimage-based CNN system includes provisions to the sizes of the input images and subimages to ensure that the merged result to be substantially or exactly identical to the output of a large-scale high-complexity CNN module that processes the entire high-resolution input image without partition. Next, the merged result is processed by the second stage of the subimage-based CNN system, which can also be implemented with one or more small-scale hardware CNN modules or be implemented with software. In this manner, the disclosed CNN system manages high-complexity tasks such as processing high-resolution input images without requiring large-scale, high-complexity, expensive hardware modules, thereby improving trade-off between performance and cost. Hence, this subimage-based CNN system can be highly applicable to resource-limited embedded systems, such as various surveillance cameras, machine vision cameras, drones, robots, self-driving cars, and mobile phones.

A Small-Scale Low-Cost Hardware CNN Module

FIG. 1A shows a block diagram of a small-scale hardware CNN module 100 for processing a low-resolution input image. In some embodiments, the CNN module 100 is configured to extract features of a resolution-limited input image and make various DL inferences, depending on the applications. As can be seen in FIG. 1A, CNN module 100 includes at least two submodules, denoted as CNN1 and CNN2. In some embodiments, CNN module 100 is configured to limit the input image 102 size to no more than 1280 pixels, for example, an image resolution of 32×40 pixels. This limitation on the input image sizes also significantly limits the types of applications which are suitable for CNN module 100.

FIG. 1B shows a more detailed implementation of hardware CNN module 100. As can be seen in FIG. 1B, the first submodule CNN1 in FIG. 1A further includes multiple alternating convolution (CONV) layers, rectified linear unit (ReLU) layers (not shown) and pooling layers coupled in series. Moreover, for each of the CONV layers, such as CONV(1) layer, a set of convolution filters are employed to extract a set of particular features from input image 102. Each of the CONV layers in the submodule CNN1 is followed by a corresponding ReLU layer (not shown) and pooling layer, such as POOL(1) layer, which is configured to reduce the size of the filtered images generated by the corresponding CONV layer, while preserving some of the extracted features.

Also shown in FIG. 1B, the second submodule CNN2 in FIG. 1A further includes multiple alternating fully-connected (FC) layers and ReLU layers (not shown) coupled in series. Each of the FC layers, such as FC(1) layer, in the submodule CNN2 is configured to perform matrix multiplications. Each of the FC layers (except for the last FC layer) is followed by a corresponding ReLU layer (not shown). Although not explicitly shown in FIG. 1B, each of the ReLU layers in CNN1 and CNN2 is configured to provide nonlinear characteristics to the CNN system. Finally, at the output of the last FC layer (e.g., FC(n) layer), a decision module (also not shown) is configured to make a prediction based on the output of the last FC layer, thereby generating the output 104 of the CNN module 100. In some embodiments, the first submodule CNN1 includes 1-8 CONV, ReLU, and pooling layers, while the second submodule CNN2 includes 3-8 fully-connected (FC) layers and ReLU layers.

In some embodiments, the number of convolution filters in each of the CONV layers is at most 50, and only 3×3 filters are allowed. Moreover, the convolution stride is fixed to be 1, and no zero padding is used. In some embodiments, the pooling layers in CNN1 can use a max-pooling technique to select the maximum value from each of the 2×2 regions in the filter images. In some embodiments, both max-pooling and average pooling are supported, but the pooling window size is fixed to 2×2, and the stride is fixed to 2. In other words, each of the image width and height is reduced by one half after each pooling layer.

For the example of the hardware CNN module within Hi3519 SoC, the maximum input dimension for the first FC layer is 1024, and the number of neurons in the middle FC layers is at most 256. The dimension of the CNN module output is at most 256. Due to these constraints, the hardware CNN module within Hi3519 SoC is typically only suitable for performing simple applications such as handwritten digit recognition and license plate recognition. For more challenging applications such as face recognition, directly applying a small-scale CNN module such as CNN module 100 would be infeasible at least because of the following reasons. First, the maximum input resolution of 1280 pixels (such as 40×32) is very restrictive, because a face image down-sampled to this resolution loses too much important facial information. Second, the learning capacity of the small CNN module 100 is also extremely limited.

A Tiered Subimage-Based CNN Architecture and System

FIG. 2A shows a block diagram of a conventional full-image-based CNN system 200 for processing high-resolution input images. As can be seen, conventional CNN system 200 can receive an entire high-resolution input image 202 at the first convolution layer CONV(1) and start performing feature extraction operations on the high-resolution input image 202. As such, conventional CNN system 200 can directly process the full high-resolution input image 202 without partitioning the input image. However, conventional CNN system 200 also requires using large-scale expensive chips capable of handling such high-resolution input images, such as aforementioned Nvidia™ chips.

FIG. 2B shows a block diagram of a subimage-based CNN system 210. In the disclosed CNN system 210, a resolution-limited small-scale CNN module, such as CNN module 100 described in conjunction with FIGS. 1A and 1B or the hardware CNN module inside Hi3519 SoC can be used as a building block of subimage-based CNN system 210. As mentioned above, such a small-scale CNN module has a limitation on the maximum input image size, e.g., up to 1280 pixels. To be able to use this small-scale CNN module on a high-resolution input image 202 (e.g., an image having >1280 pixels), the CNN system 210 includes an input module 212 which is configured to partition the high-resolution input image 202 into a set of smaller subimages 204, wherein each of the subimages 204 has a size which is smaller than or equal to the maximum input image size allowed/supported by the small-scale CNN module used as a building block of CNN system 210. In some embodiments, input module 212 is configured to partition the high-resolution input image 202 by including properly designed overlaps between the adjacent subimages 204, as shown in FIG. 2B. Note that the set of four subimages 204 in two rows and two columns with the illustrated gaps and overlaps are shown in FIG. 2B for the convenience of understanding the concept and not meant for representing an actual partition.

As shown in FIG. 2B, CNN system 210 includes a two-tiered processing structure based on using and/or reusing one or both of the two hardware submodules CNN1 and CNN2 of small-scale CNN module 100 described in FIGS. 1A and 1B. In addition to the input module 212, CNN system 210 also includes a first processing stage 220, a merging module 222 and a second processing stage 224. More specifically, first processing stage 220 of CNN system 210 includes at least one CNN1 processing module, such as CNN1 module 214. In some embodiments, CNN1 module 214 is implemented by the hardware submodule CNN1 described in FIGS. 1A and 1B. In other embodiments, CNN1 module 214 is implemented by the entire CNN module 100 described in FIGS. 1A and 1B which includes both CNN1 and CNN2 submodules. Note that the multiple instances of CNN1 module 214 shown within the first processing stage 220 represent the same CNN1 module 214 being used at different times $t_1, t_2, t_3, \ldots$, and $t_n$ as indicated for each such instance. Consequently, "CNN1 214 at $t_1$," "CNN1 214 at $t_2$," "CNN1 214 at $t_3$," $\ldots$, and "CNN1 214 at $t_n$," shown in FIG. 2B correspond to a single CNN1 module 214 at different processing times and should not be interpreted as multiple CNN1 modules having the same numeral 214. Although not shown, the first processing stage 220 can include additional CNN1 modules similar to CNN module 214. For example, the first processing stage 220 can include two or more identical CNN1 modules.

The second processing stage 224 of CNN system 210 includes at least one CNN2 module 216. In some embodiments, CNN2 module 216 is implemented by the hardware submodule CNN2 described in FIGS. 1A and 1B. In other embodiments, CNN2 module 216 is implemented by the entire CNN module 100 described in FIGS. 1A and 1B which includes both CNN1 and CNN2 submodules. In some other embodiments, CNN2 module 216 within the second processing stage 224 can be implemented by software instead of hardware.

Specifically, to process the set of subimages 204 generated by input module 212, single CNN1 module 214 is used multiple times by sequentially processing the set of subimages 204, one subimage at a time. That is, each instance of CNN1 block 214 within the first processing stage 220 of CNN system 210 represents one of the multiple applications of the same CNN1 module 214 on one of the set of subimages 204 at a different processing time. However, because the processing speed of each subimage 204 by CNN1 module 214 can be very fast, the overall processing time for processing the set of subimages 204 also can be quite fast. The outputs of multiple applications of CNN1 module 214 contain an array of feature maps 206 corresponding to the set of subimages 204 after multiple layers of convolution, ReLU, and pooling operations.

Note that although the embodiment shown in FIG. 2B is based on reusing a single hardware CNN1 module 214 in the first processing stage 220 of CNN system 210, other embodiments can use additional hardware CNN1 modules similar or identical to CNN1 module 214 in the first processing stage 220 of CNN system 210, so that the set of subimages 204 can be processed in parallel by the multiple hardware CNN1 modules. The actual number of CNN1 modules used by a given design can be determined based on the trade-off between hardware cost constraint and speed requirement. For example, some variations to CNN system 210 can include 3 to 5 CNN1 modules in the first processing stage.

As mentioned above, CNN1 module 214 can be implemented by either a dedicated hardware submodule CNN1 such as those described in conjunction with FIGS. 1A and 1B or by the entire CNN module 100 described in conjunction with FIGS. 1A and 1B which includes both CNN1 and CNN2 submodules. In the first scenario, CNN1 module 214 within CNN system 210 can include only CONV, ReLU, and pooling layers. In the second scenario, implementing CNN1 module 214 in CNN system 210 further includes bypassing the FC layers and the corresponding ReLU layers, i.e., bypassing the submodule CNN2 within CNN module 100. When bypassing the CNN2 submodule, it is necessary for the CNN1 module 214 to preserve the spatial location information in its output feature maps, because the outputs from the CNN1 module 214 will be merged for further processing. For some built-in hardware CNN modules, such as a hardware CNN module within Hi3519 SoC, the parameters of the built-in CNN module are reconfigurable. Using this property, bypassing the submodule CNN2 when such a built-in hardware CNN module is used can be achieved by forcing each of the FC layers within CNN module 100 to be an identity matrix, so that the output from each of the FC layer is simply a reorganization of the two-dimensional feature maps into a one-dimensional vector. The ReLU layer after each FC layer can be applied as usual. In a partition embodiment, for a three FC-ReLU-layer CNN2 submodule configuration, the last two ReLU layers do not change any data, because the concatenation of multiple ReLU layers is equivalent to just one ReLU layer.

Referring back to FIG. 2B, after sequentially applying CNN1 module 214 to each of the set of subimages 204, the outputs from CNN1 module 214 containing the array of feature maps 206 become the inputs to merging module 222 which is configured to merge the array of feature maps 206 to form the full feature maps of the entire input image 202. The merged feature maps can then be used as the inputs to the second processing stage 224 of CNN system 210. In some embodiments, the output 228 from the second processing stage 224 is the output from the last FC layer of CNN2 module 216. Ideally, output 228 is identical to the output 226 of the conventional CNN system 200 in FIG. 2A.

In some embodiments, the array of feature maps 206 includes a set of three-dimensional (3D) matrices (i.e., two dimensions for a given feature map and one dimension for the number of feature maps). For example, the array of feature maps 206 can be composed of nine (i.e., a 3×3 array of) 3D matrices of 2×2×48 sizes, wherein nine is the number of subimages 204 having indices of 0, 1, 2, . . . , 8 (i.e., subimages of 3 rows by 3 columns), 2×2 is the size of a single output feature map after CNN1 module 214 for each subimage, and 48 is the number of feature maps for each subimage. In some embodiments, merging module 222 is configured to merge the array of feature maps 206 by concatenating the set of 3D output matrices based on the corresponding indices to form a merged 3D feature-map matrix, while preserving the spatial relationships of the set of subimages 204. In the above example, this step generates a 3D matrix of 6×6×48. Next, the merged 3D matrix can be flattened into a one-dimensional (1D) vector. In the above example, this creates a 1D vector having a size of 1728. Finally, the flattened 1D vector is fed into the second processing stage 224.

FIG. 2B shows that the merged feature maps 208 generated by merging module 222 are fed into the second processing stage 224 of CNN system 210 for further processing. More specifically, the second processing stage 224 of CNN system 210 includes at least one CNN2 module 216, which further includes a set of FC layers and ReLU layers as described above. As mentioned above, CNN2 module 216 in CNN system 210 can be implemented by a dedicated hardware submodule CNN2 described in conjunction with FIGS. 1A and 1B. In these embodiments, CNN2 module 216 within CNN system 210 can include only FC layers and ReLU layers. In some embodiments, CNN2 module 216 can be implemented by taking an entire hardware CNN module 100 described in FIGS. 1A and 1B which includes both CNN1 and CNN2 submodules. In these embodiments, implementing CNN2 module 216 in CNN system 210 further includes bypassing the CONV-ReLU-pooling layers, i.e., bypassing the submodule CNN1 within CNN module 100. In some systems such as Hi3519, it may be difficult to bypass the CONV-ReLU-pooling layers to use the FC layers and ReLU layers directly. In these cases, CNN2 module 216, i.e., the FC layers and ReLU layers can be implemented by software. Because most of the computational complexity of CNN system 210 is in the CONV layers, implementing the FC and ReLU layers in software typically has minor effect on the overall speed of the system. Furthermore, systems such as Hi3519 also provide additional tools to optimize the speed of such a software implementation.

As mentioned above, CNN2 module 216 within the second processing stage 224 can be implemented by software instead of a hardware CNN module. Note that most of the computational complexity of CNN system 210 is in the convolution layers implemented by CNN1 module 214 because the complexity of the FC layers and ReLU layers are generally much lower than the convolution layers. As a result, the low computational complexity operations implemented by the hardware CNN2 module 216 in CNN system 210 can be implemented by software in place of hardware CNN2 or CNN modules mentioned above. Moreover, such a software approach can provide more flexibilities than the embodiments based on the hardware CNN modules.

The Proposed Face Detection CNN Architecture

Of the two aforementioned face detection frameworks, the MTCNN has a simpler structure than the cascaded CNN because the MTCNN uses three CNN stages compared to the six stages used by the cascaded CNN. Moreover, the MTCNN can detect the facial landmark locations, which are useful to track a person and decide the pose of each face. Consequently, various examples of the proposed face detection CNN system and technique described below are based on the MTCNN framework which uses three stages. However, it should be noted that the proposed face detection CNN system and technique can also be applied to the cascaded CNN framework.

It has been mentioned above that the built-in CNN module in Hi3519 cannot be directly used to implement each stage of the MTCNN in the original design without resolving the input image size constraints of the built-in CNN module. In fact, the original design of the MTCNN violates and is in confliction with many constraints of the built-in CNN module in Hi3519. These conflicts include, but are not limited:

Maximum input image size: as mentioned above, in Hi3519, the maximum number of pixels in the input image supported by Hi3519 is 1280. In contrast, in the original design of the MTCNN, the input image size to the second stage is 24×24×3=1728, and the input image size to the third stage is 48×48×3=6912. Both of input sizes exceed the input image size limit of Hi3519.

Minimum input image size: in Hi3519, the minimum width or height of an input image is 16 pixels. In contrast, in the original design of the MTCNN, the input image size to the first stage is 12×12, which is too small for Hi3519.

Number of filters: in the built-in CNN module in Hi3519, the maximum number of filters in each of the convolutional (CONV) layers is 50. In contrast, several CONV layers in the original design of the MTCNN have 64 or 128 filters.

CNN architecture: in the built-in CNN module in Hi3519, each CONV layer is followed by a Max Pooling (MP) layer. However, the MTCNN usually uses two or three consecutive CONV layers without any MP layers between them.

Pooling window size: in the built-in CNN module in Hi3519, the MP layer is designed to support pooling window size of 2×2 pixels, whereas in the MTCNN, 3×3 max pooling windows are frequently used.

CONV layer filter size: in the built-in CNN module in Hi3519, the CONV layers use 3×3 filters, whereas in the MTCNN, the CONV layers usually use 5×5 filters and 2×2 filters.

Non-linear function: the MTCNN uses parametric rectified linear unit (PReLU) as the non-linear function, whereas the built-in CNN module in Hi3519 uses rectified linear unit (ReLU).

Fully connected (FC) layer: the first stage of the original design of the MTCNN is a fully convolutional network (FCN) to reduce the running time of the sliding window approach during testing, where there is no FC layer involved. In contrast, Hi3519 requires at least 3 FC layers in a CNN.

Various examples of the proposed face detection CNN system and technique are designed to resolve the above-mentioned conflicts so that the original CNN within each stage of the MTCNN can be implemented with a small-scale low-cost CNN module, such as the built-in CNN module in Hi3519.

FIG. 3 shows a block diagram of an exemplary face detection system 300 based on a small-scale hardware CNN module in accordance with some embodiments described herein. In some embodiments, face detection system 300 is implemented on a CNN-enabled embedded system including a small-scale low-cost SoC, such as Hi3519 SoC. As shown in FIG. 3, face detection system 300 receives a video image 302 as input and generates face detection decisions 316 as output. In some embodiments, input video image 302 is a video frame of a video captured by a camera. Note that face detection system 300 includes at least a motion detection module 304, a pyramid and patch generation module 306, a first stage CNN 308, a second stage CNN 310, a third stage CNN 312 and a final decision module 314. Face detection system 300 can also include additional modules not shown in FIG. 3. We now describe each of the blocks in face detection system 300 in more detail.

As can be seen, input video image 302 is first received by motion detection module 304. In some embodiments, it is assumed that a human face within a given video is associated with a motion. Hence, to reduce the computational complexity, motion detection module 304 can be used to locate and identify those areas within each video frame which are associated with motions based on comparisons with previously received video frames. Note that these moving areas can include both human objects and non-human objects such as a moving vehicle. Moreover, for a moving human object, a moving area can include both the human face and the human body. When face detection system 300 is implemented on Hi3519, motion detection module 304 can be implemented with the built-in motion detection hardware module within Hi3519. The output from motion detection module 304 includes a set of identified moving areas 318 which can have different sizes. Each identified moving area 318, which is a portion of the input video image 302, is then sent to the subsequent face detection modules within face detection system 300 to detect most or all faces within the moving area. In this embodiment, a non-moving area within input video image 302 is typically not considered for face detection. However, some other embodiments of the proposed face detection system can be constructed without a motion detection module.

In some embodiments, motion detection module 304 can be replaced by or combined with a face tracking module (not shown) which is configured to compute the trajectories of detected faces by face detection system 300. More specifically, a face tracking module can be configured to compute the trajectories based on the face locations in the previous video frames, predict the new locations of the detected faces in a new video frame based on the computed trajectories, and subsequently search these faces in the vicinity of the predicted locations. Note that by combining motion detection and face tracking within face detection system 300, the face detection speed can be significantly increased.

In some embodiments, the size of a given moving area 318 generated by motion detection module 304 (or by a face tracking module, or by a combination of motion detection and face tracking) has a minimum value. The minimum size of the moving area can be determined based on one or more design parameters as well as the constraints of the small-scale hardware CNN module used in face detection system 300, such as Hi3519. In some embodiments, the one or more design parameters include an initial downsampling factor specified for pyramid and patch generation module 306 and a minimum input image size of first stage CNN 308. For example, if the initial downsampling factor of pyramid and patch generation module 306 is 2:1 and the minimum input image size of first stage CNN 308 is 16×16, the minimum size of a detectable face would be 32×32. As another example, if the initial downsampling factor of the pyramid and patch generation module 306 is 3:1 and the minimum input image size of first stage CNN 308 is 16×16, the minimum size of a detectable face would be 48×48. To reduce the complexity, usually the minimal size of the moving area 318 that is sent to the face detection modules is greater than the minimal detectable face size. In some embodiments, the maximum size of a moving area generated by motion detection module 304 can be as large as the entire input video image 302. For example, such a moving area can be corresponding to an input image substantially fully occupied by a human face.

As can be seen in FIG. 3, each of the detected moving areas 318 generated by motion detection module 304 (or by a face tracking module, or by a combination of motion detection and face tracking) is processed in a similar manner by the other modules within face detection system 300, including pyramid and patch generation module 306, first stage CNN 308, second stage CNN 310, the third stage CNN 312 and the final decision module 314. Hence, the operations described below associated with pyramid and patch generation module 306, first stage CNN 308, second stage CNN 310, the third stage CNN 312 and the final decision module 314 are repeated for each of the detected moving areas 318. This process loop over all of the detected moving areas 318 is indicated by a dashed box placed around these modules. Hence, the following discussion on face detection system 300 is directed to and equally applicable to all of the detected moving areas 318.

Next in face detection system 300, each detected moving area 318, which is a portion of input video image 302, is received by pyramid and patch generation module 306. Pyramid and patch generation module 306 is configured to convert moving area 318 into a "pyramid" of multi-resolution representations of moving area 318 by downsampling moving area 318 with different downsampling factors, whereby allowing subsequent face detection modules to detect faces of different scales in moving area 318. More specifically, a higher-resolution representation of the moving area 318 in the "pyramid" can be used to detect smaller faces in the original input image 302, while a lower-resolution representation of moving area 318 in the "pyramid" can be used to detect larger faces in the original input image 302.

In some embodiments, the highest resolution representation of moving area 318 in the pyramid is determined by the input size of first stage CNN 308 and a desired minimum size of the faces that can be detected. Note that the input size of first stage CNN 308 can be a user-defined parameter, but the minimum values of the input size are restricted by the minimum input size of first stage CNN 308, which can be device-specific constraints. For example, for the built-in CNN module in Hi3519 SoC, the minimum input size is 16×16. This constraint dictates that the input size of first stage CNN 308 needs to be at least 16×16. Moreover, the highest resolution representation will also determine the smallest face that can be detected by face detection system 300. More specifically, the smallest face that can be detected can be determined by multiplying the input size of first stage CNN 308 with the downsampling factor used by pyramid and patch generation module 306. For example, if 16×16 is used as the input size of first stage CNN 308, and an initial downsampling factor of 3 is used by pyramid and patch generation module 306, then the smallest face that can be detected will be 48×48. If an initial downsampling factor of 2 is used by pyramid and patch generation module 306 and 16×16 is used as the input size, then the smallest face that can be detected will be 32×32 instead.

Note that which downsampling factor is used by pyramid and patch generation module 306 is a consideration of trade-offs between face detection accuracy and speed. On the other hand, the initial downsampling factor can be determined as the ratio of the desired minimum size of the faces that can be detected to the input size of first stage CNN 308. For example, suppose that 16×16 is used as the input size of first stage CNN 308 and the desired minimum size of the faces that can be detected is around 48×48, then an initial downsampling factor of 3 should be used. In some embodiments, the user-specified input size of first stage CNN 308 can be greater than the minimum input size of first stage CNN 308, i.e., >16×16.

In some embodiments, the lowest resolution representation of the moving area 318 in the pyramid can be equal or close to but no smaller than the minimum input size of first stage CNN 308, which is 16×16 in Hi3519. For example, the lowest resolution representation of the moving area 318 can be a 24×24 image. Other resolution representations of the moving area 318 can be spaced between the lowest and the highest resolution representations in the pyramid, and typically spaced by a factor of 2:1 or 3:1 between the adjacent resolution representations.

For each received moving area 318, pyramid and patch generation module 306 generates a pyramid of multi-resolution representations of this moving area 318. In other words, pyramid and patch generation module 306 generates a set of images of different resolutions corresponding to the same portion of the original input video image 302. In some embodiments, rather than processing each image in the pyramid as a whole, first stage CNN 308 processes image patches based on a user-specified input size as mentioned above. For example, if input size of 16×16 is used, then each image in the pyramid is further partitioned into a set of 16×16 image patches.

In some embodiments, pyramid and patch generation module 306 is configured to partition each image in the pyramid into a set of image patches using a sliding window approach. More specifically, a set of image patches can be generated by stepping a sliding window of user-specified size, e.g., of 16×16 through each image in the pyramid with a user-specified stride, e.g., of 2 or 4 pixels in both row and column directions, such that one image patch is generated at each sliding window location. As a result, pyramid and patch generation module 306 generates and outputs sets of image patches 320 of the same size corresponding to the set of multi-resolution representations of the moving area 318. Note that a higher resolution representation of moving area 318 can produce significantly more image patches than a lower resolution representation of moving area 318. Next, the sets of image patches 320 are received by first stage CNN 308. Depending on the hardware configuration, first stage CNN 308 can process the received image patches 320 in a sequential order one image patch at a time or process multiple image patches in parallel to speed up the processing speed. We now describe some embodiments of first stage CNN 308 in more detail.

Figure 4:
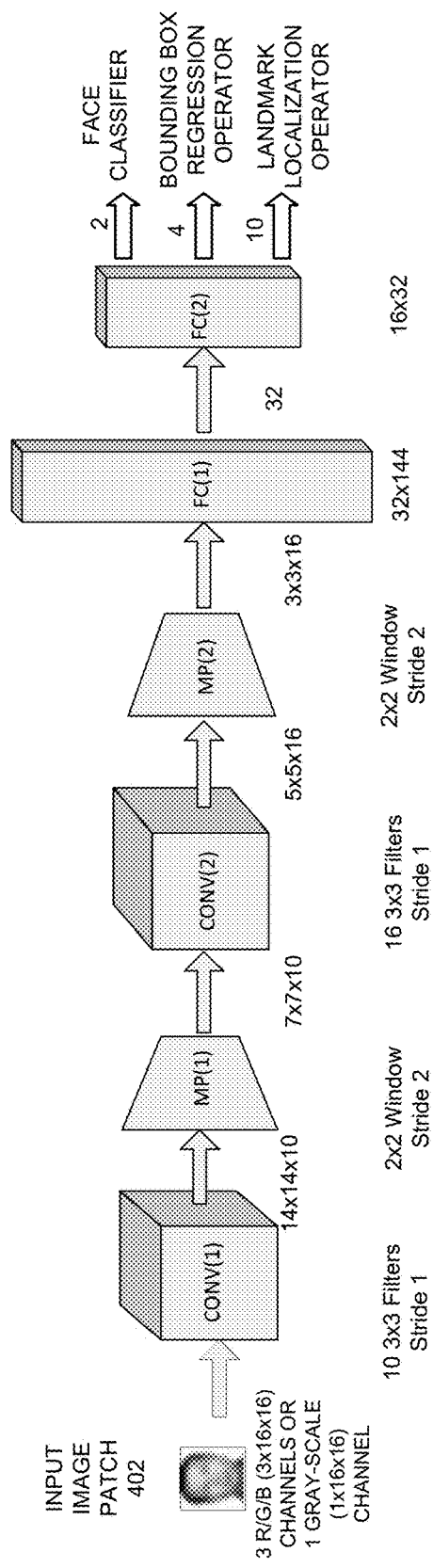
FIG. 4 shows a block diagram of an exemplary implementation of the first stage CNN shown in FIG. 3 based on a small-scale hardware CNN module in accordance with some embodiments described herein.

First stage CNN 308 is used to process each received image patch corresponding to each sliding window location within each pyramid representation of the moving area 318. FIG. 4 shows a block diagram of an exemplary implementation 400 of first stage CNN 308 based on a small-scale hardware CNN module in accordance with some embodiments described herein.

As can be seen in FIG. 4, first stage CNN 400 includes two stages of CONV and MP layers (i.e., CONV(1)/MP(1) and CONV(2)/MP(2)), followed by two FC layers (i.e., FC(1) and FC(2)). In some embodiments, each of the CONV and FC layers (except for the last FC layer) is followed by a ReLU layer, which is not shown in FIG. 4. In some embodiments, the input to first stage CNN 400 includes 3 R/G/B channels of an input image patch 402 (i.e., one of the sets of image patches 320 in FIG. 3), each channel of size 16×16. In other embodiments, the input to first stage CNN 400 includes a grayscale image (i.e., a single channel) of an input image patch 402. For a given input image patch 402, using an associated grayscale image can entail shorter processing time than using 3 R/G/B channels. Hence, using the grayscale image can be advantageous over using 3 R/G/B channels per input image if the performances associated with the two types of inputs are substantially the same. In the embodiment shown, CONV(1) layer includes 10 3×3 filters of stride 1. Hence, the output of CONV(1) layer has a dimension of 14×14×10. The MP(1) layer uses 2×2 pooling windows with a stride of 2. Hence, the output of MP(1) layer has a dimension of 7×7×10. The CONV(2) layer includes 16 3×3 filters of stride 1. Hence, the output of CONV(2) layer has a dimension of 5×5×16. The MP(2) layer uses 2×2 pooling windows with a stride 2. Hence, the output of MP(2) layer has a dimension of 3×3×16. The outputs of the first and last FC layers are 32×1 and 16×1 vectors, respectively. In some embodiments, in the final 16×1 output vector, the first 2 outputs are used to generate the face detection confidence score (also referred as to as "face classifier"); the next 4 outputs are the bounding box coordinates (also referred as to as "bounding box regression operator") of the face in the image patch 402 (i.e., if a face is detected in the image patch 402); and the last 10 outputs indicate the locations of 5 facial landmark points of the detected face, i.e., left eye, right eye, nose, and two corners of the mouth (also referred as to as "landmark localization operator"). Hence, first stage CNN 400 outputs a set of candidate facial windows/bounding boxes corresponding to a subset of the image patches 320 shown in FIG. 3.

Note that the combination of the numbers of layers and filters, input image size, filters and pooling window sizes, FC layer output sizes, and other parameters shown in first stage CNN 400 is merely one exemplary configuration of first stage CNN 308. Many other configurations of first stage CNN 308 can be constructed which use one or more different parameter values from those shown in FIG. 4 without departing from the scope of the described technology. In some embodiments, first stage CNN 308, such as the exemplary first stage CNN 400 shown in FIG. 4 is configured to meet the constraints of a small-scale hardware CNN module, such as the built-in hardware CNN module within Hi3519, and therefore can be implemented by the built-in hardware CNN module within Hi3519.

In some embodiments, to eliminate more "false alarms" from those image patches detected as faces by first stage CNN 308 but are not actually faces, a filter can be applied to the face detection confidence scores in the detection outputs to only keep those input image patches with face detection confidence scores greater than a threshold values (e.g., a typical threshold value can be set between 0.5~0.7). In some embodiments, this filtering operation is implemented in first stage CNN 308 after the last FC layer.

Note that as a result of generating multi-resolution representations using the pyramid technique and image patches with the sliding window technique, many or multiple overlapping but non-identical bounding boxes can be generated around each face in the input image. In some embodiments, for each image block that is classified by first stage CNN 308 as a face, a corresponding image region in the original input video image 302 is identified. Next, a non-maximum suppression (NMS) technique can be used to merge those highly overlapped bounding boxes, as described in the MTCNN. Note that this NMS operation can be performed after the aforementioned filtering operation on the candidate facial windows. In some embodiments, the NMS operation is implemented in first stage CNN 308 within face detection system 300. After the NMS operation, the remaining bounding boxes can be refined through a bounding box regression operation to refine the bounding box locations, as also described in the MTCNN. Again, this NMS operation can be implemented in first stage CNN 308 within face detection system 300. Hence, after one or more additional processing, first stage CNN 308 outputs a set of candidate bounding boxes of faces, or "candidate facial windows."

In some embodiments, for each candidate facial window 322 output by first stage CNN 308, a corresponding image patch is located and cropped from the original input video image 302, and the cropped image patch is subsequently resized to a user-specified input size of second stage CNN 310. Based on the coarse-to-fine approach, this input size should be larger than the input size of first stage CNN 308. In some embodiments, second stage CNN 310 is configured with an input size of 24×24. As a result, the resized image patches also have the size of 24×24. However, other embodiments of second stage CNN 310 can use similar but slightly different input sizes from 24×24 without departing from the scope of the described technology. The process of generating resized image patches from candidate facial windows 322 can be implemented in hardware, in software, or in a combination of hardware and software. The corresponding processing module can be positioned between first stage CNN 308 and second stage CNN 310 and is not explicitly shown. Next, the resized image patches are received by second stage CNN 310. Depending on the hardware configuration, second stage CNN 310 can process the received resized image patches 324 in a sequential order one image patch at a time or process multiple image patches in parallel to speed up the processing speed. We now describe some embodiments of second stage CNN 310 in more detail.

Figure 5:
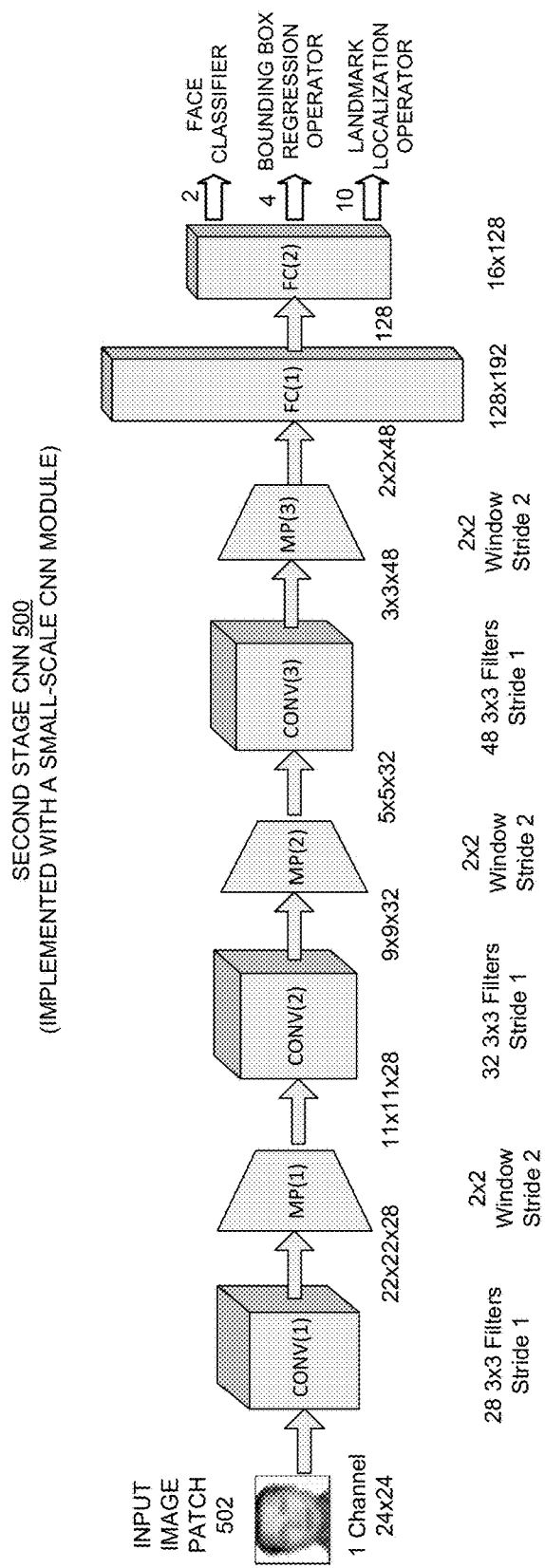
FIG. 5 shows a block diagram of an exemplary implementation of the second stage CNN shown in FIG. 3 based on a small-scale hardware CNN module in accordance with some embodiments described herein.

FIG. 5 shows a block diagram of an exemplary implementation 500 of second stage CNN 310 based on a small-scale hardware CNN module in accordance with some embodiments described herein.

As can be seen in FIG. 5, second stage CNN 500 includes three stages of CONV and MP layers (i.e., CONV(1)/MP(1), CONV(2)/MP(2) and CONV(3)/MP(3)), followed by two FC layers (i.e., FC(1) and FC(2)). In some embodiments, each of the CONV and FC layers (except for the last FC layer) is followed by a ReLU layer, which is not shown in FIG. 5. In some embodiments, second stage CNN 500 is configured to meet the constraints of the built-in hardware CNN module in Hi3519. For example, the input to second stage CNN 500 is a single channel of grayscale image 502 (i.e., one of the resized image patches 324 in FIG. 3) of size 24×24×1, instead of an RGB image of size 24×24×3 used in the second stage CNN in MTCNN. This is because the maximum input size supported by Hi3519 is 1280 pixels (<24×24×3=1728). However, experimental results show that the performance impact of using grayscale image instead of color image is insignificant. As a result, second stage CNN 500 can be efficiently implemented by a small-scale hardware CNN such as the embedded CNN within Hi3519.

In the embodiment shown, CONV(1) layer includes 28 3×3 filters of stride 1. Hence, the output of CONV(1) layer has a dimension of 22×22×28 (based on the input image size of 24×24). The MP(1) layer uses 2×2 pooling windows with a stride of 2. Hence, the output of MP(1) layer has a dimension of 11×11×28. The CONV(2) layer includes 32 3×3 filters of stride 1. Hence, the output of CONV(2) layer has a dimension of 9×9×32. The MP(2) layer uses 2×2 pooling windows with a stride 2. Hence, the output of MP(2) layer has a dimension of 5×5×32. The CONV(3) layer includes 48 3×3 filters of stride 1. Hence, the output of CONV(3) layer has a dimension of 3×3×48. The MP(3) layer uses 2×2 pooling windows with a stride 2. Hence, the output of MP(3) layer has a dimension of 2×2×48. The outputs of the first and last FC layers are 128×1 and 16×1 vectors, respectively. Note that although each of the CONV layers uses more filters than those used in first stage CNN 400 and the sizes of the FC layers are also bigger than those used in first stage CNN 400, second stage CNN 500 is still designed to meet the constraints of the built-in CNN module in Hi3519.

As can be seen, the output of the final FC layer in second stage CNN 500 is still an 16×1 output vector, with the first 2 outputs used to generate the face detection confidence score or face classifier; the next 4 outputs are the bounding box coordinates or the bounding box regression operator of the face in the input image patch 502 (i.e., if a face is detected in the image patch 502); and the last 10 outputs indicate the locations of 5 facial landmark points of the detected face, i.e., left eye, right eye, nose, and two corners of the mouth, i.e., landmark localization operator. However, because the input image resolution in second stage CNN 500 is higher than the input image resolution in first stage CNN 400, and CNN 500 is more powerful than CNN 400, the face detection accuracy of CNN 500 is also higher than the accuracy of CNN 400. Hence, second stage CNN 500 outputs a set of candidate facial windows/bounding boxes (shown as candidate facial windows 326 in FIG. 3) corresponding to a subset of the input image patches 502.

Similar to first stage CNN 308, a confidence score threshold can be applied to the face detection confidence scores in the detection outputs of second stage CNN 310 to only keep those input image patches with face detection confidence scores greater than the threshold value. In some embodiments, this filtering operation is implemented in second stage CNN 310 after the last FC layer. Similarly, after filtering the candidate bounding boxes, highly overlapped candidate bounding boxes can be merged using the aforementioned NMS technique. In some embodiments, this NMS operation is also implemented in second stage CNN 310. Typically, after the filtering and NMS operations, only a small subset of the candidate facial windows remains. After the NMS operation, the locations of the remaining bounding boxes can be refined through a bounding box regression operation, which can be implemented in second stage CNN 310.

Note that the combination of the numbers of layers and filters, size of the input image, sizes of the filters and pooling windows, FC layer output sizes, and other parameters shown in first stage CNN 500 is merely one exemplary configuration of second stage CNN 310. Many other configurations of second stage CNN 310 can be constructed which use one or more different parameter values shown in FIG. 5 without departing from the scope of the described technology. For example, instead of using an input size of 24×24 for second stage CNN 310, other similar sizes, e.g., 32×32 can be used instead. In some embodiments, second stage CNN 310, such as the exemplary second stage CNN 500 shown in FIG. 5 is configured to meet the constraints of a small-scale hardware CNN module, such as the built-in hardware CNN module within Hi3519, and therefore can be implemented by the built-in hardware CNN module within Hi3519.

In some embodiments, for each of the candidate facial windows 326 output by second stage CNN 310, a corresponding image patch is located and cropped from the original input video image 302, and the cropped image patch is subsequently resized to a user-specified input size of third stage CNN 312. Based on the coarse-to-fine approach, this input size should be larger than the input sizes of both the first and second stage CNNs 308 and 310. In some embodiments, third stage CNN 312 is configured with an input size of 46×46. As a result, the resized image patches also have the size of 46×46. However, other embodiments of third stage CNN 312 can use similar but slightly different input sizes from 46×46 without departing from the scope of the described technology. The process of generating resized image patches from the candidate bounding boxes can be implemented in hardware, in software, or in a combination of hardware and software. The corresponding processing module can be positioned between second stage CNN 310 and third stage CNN 312 and is not explicitly shown. Next, the set resized image patches 328 is received by third stage CNN 312 for final refinement. Depending on the hardware configuration, third stage CNN 312 can process the received resized image patches 328 in a sequential order one image patch at a time or process multiple image patches in parallel to speed up the processing speed.

In principle, third stage CNN 312 should process the input image patches 328 in a similar manner as in first stage CNN 308 and second stage CNN 310. For example, FIG. 6 shows a block diagram of an exemplary implementation 600 of third stage CNN 312 in accordance with some embodiments described herein.

Figure 6:
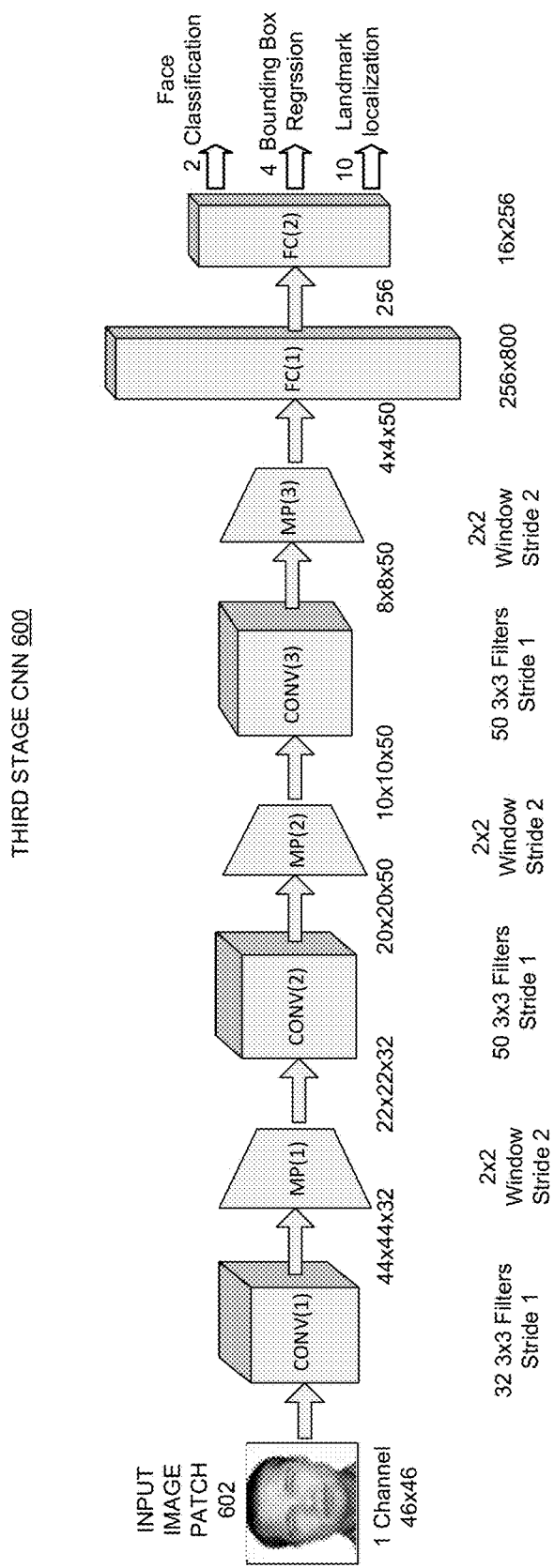
FIG. 6 shows a block diagram of an exemplary implementation of third stage CNN shown in FIG. 3 in accordance with some embodiments described herein.

As can be seen in FIG. 6, third stage CNN 600 also includes three stages of CONV and MP layers (i.e., CONV (1)/MP(1), CONV(2)/MP(2) and CONV(3)/MP(3)), followed by two FC layers (i.e., FC(1) and FC(2)). In the embodiment shown, CONV(1) layer includes 32 3×3 filters of stride 1. Hence, the output of CONV(1) layer has a dimension of 44×44×32 (based on the input image size of 46×46). The MP(1) layer uses 2×2 pooling windows with a stride of 2. Hence, the output of MP(1) layer has a dimension of 22×22×32. The CONV(2) layer includes 50 3×3 filters of stride 1. Hence, the output of CONV(2) layer has a dimension of 20×20×50. The MP(2) layer uses 2×2 pooling windows with a stride 2. Hence, the output of MP(2) layer has a dimension of 10×10×50. The CONV(3) layer includes 50 3×3 filters of stride 1. Hence, the output of CONV(3) layer has a dimension of 8×8×50. The MP(3) layer uses 2×2 pooling windows with a stride 2. Hence, the output of MP(3) layer has a dimension of 4×4×50. The outputs of the first and last FC layers are 256×1 and 16×1 vectors, respectively.

Note that the input image patch 602 (i.e., one of the resized image patches 328 in FIG. 3) has a size of 46×46×1=2116 (i.e., only a single channel of grayscale image is used) and in the above discussion of third stage CNN 600 it is necessary that the maximum input size of third stage CNN 600 is greater than 2116. However, if a CNN module has a maximum input size smaller than 2116, such a CNN module cannot be configured to implement third stage CNN 600. Consequently, the embodiment shown in FIG. 6, while may be useful during the design stage to optimize the network parameters, cannot be implemented with the built-in hardware CNN module in Hi3519 which only supports a maximum input size of 1280 pixels.

Figure 7:
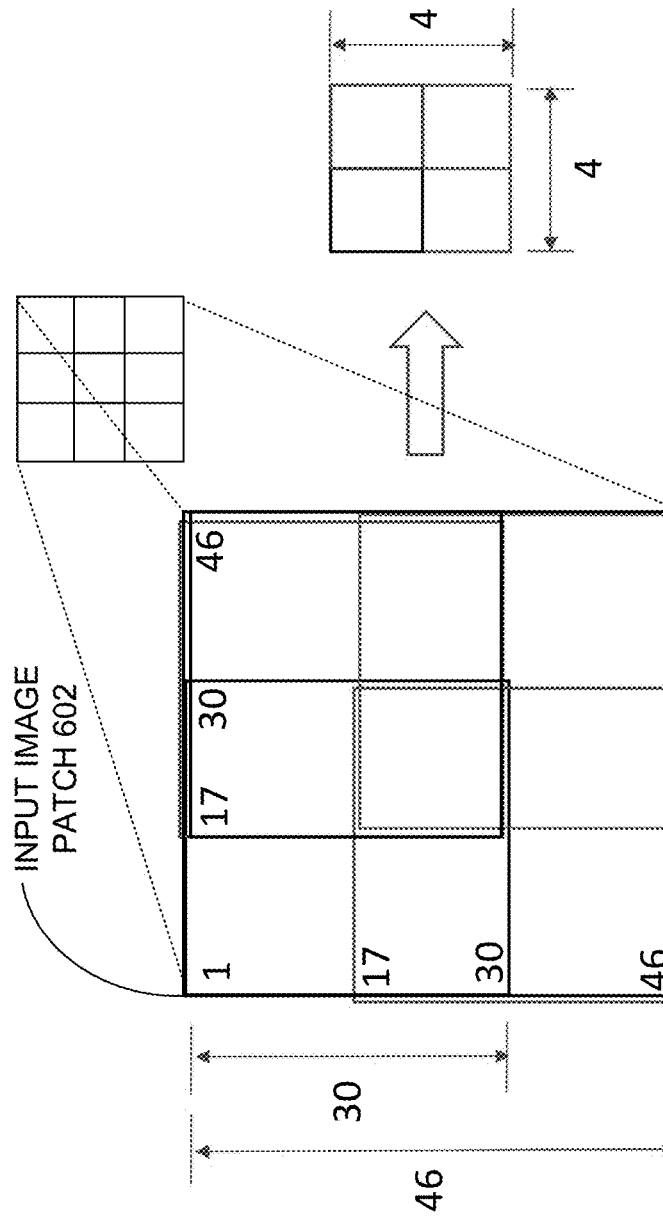
FIG. 7 shows an exemplary input image partition scheme for a 46×46 image patch in accordance with some embodiments described herein.

To resolve the above-described problem, the subimage-based CNN system and technique described in the related patent application can be used. More specifically, using the subimage-based CNN system and technique, the input image patch 602 can be partitioned into a set of overlapping subimages. For example, FIG. 7 shows an exemplary input image partition scheme for the 46×46 image patch in accordance with some embodiments described herein. As can be seen on the left side in FIG. 7, input image patch 602 is partitioned into a set of 4 overlapping subimages or patches, each having a size of 30×30, and a shift or a stride of 16 pixels between neighbouring subimages. Also note that in FIG. 7, small artificial offsets are used to slightly shift the four subimages from their overlapping configuration so that they can be better visualized and more easily distinguished from one another. However, these artificial offsets are only used for the purpose of visualizing these overlapping subimages and should not be construed as actual offsets between these subimages in an implementation. In fact, the row coordinates of these 4 subimages start at 1 and 17, respectively, and the column coordinates of the 4 subimages start at 1 and 17, respectively. The set of 4 overlapping subimages without the artificial offsets is shown as a smaller inset to the upper right corner of the main image with the artificial offsets.

Note that the specific values of input image size of 46×46, the subimage size of 30×30, and the stride size of 16 are all designed based on the theory described in the related patent application Ser. No. 15/441,194, the content of which is incorporated herein by reference. As described and proved in the related patent application, using these design values ensures that the merged output from the individual outputs of the 4 subimages is equivalent to the output from third stage CNN 600 if the entire input image patch 602 is processed by third stage CNN 600 as a whole without using the subimage-based CNN technique.

Figure 8:
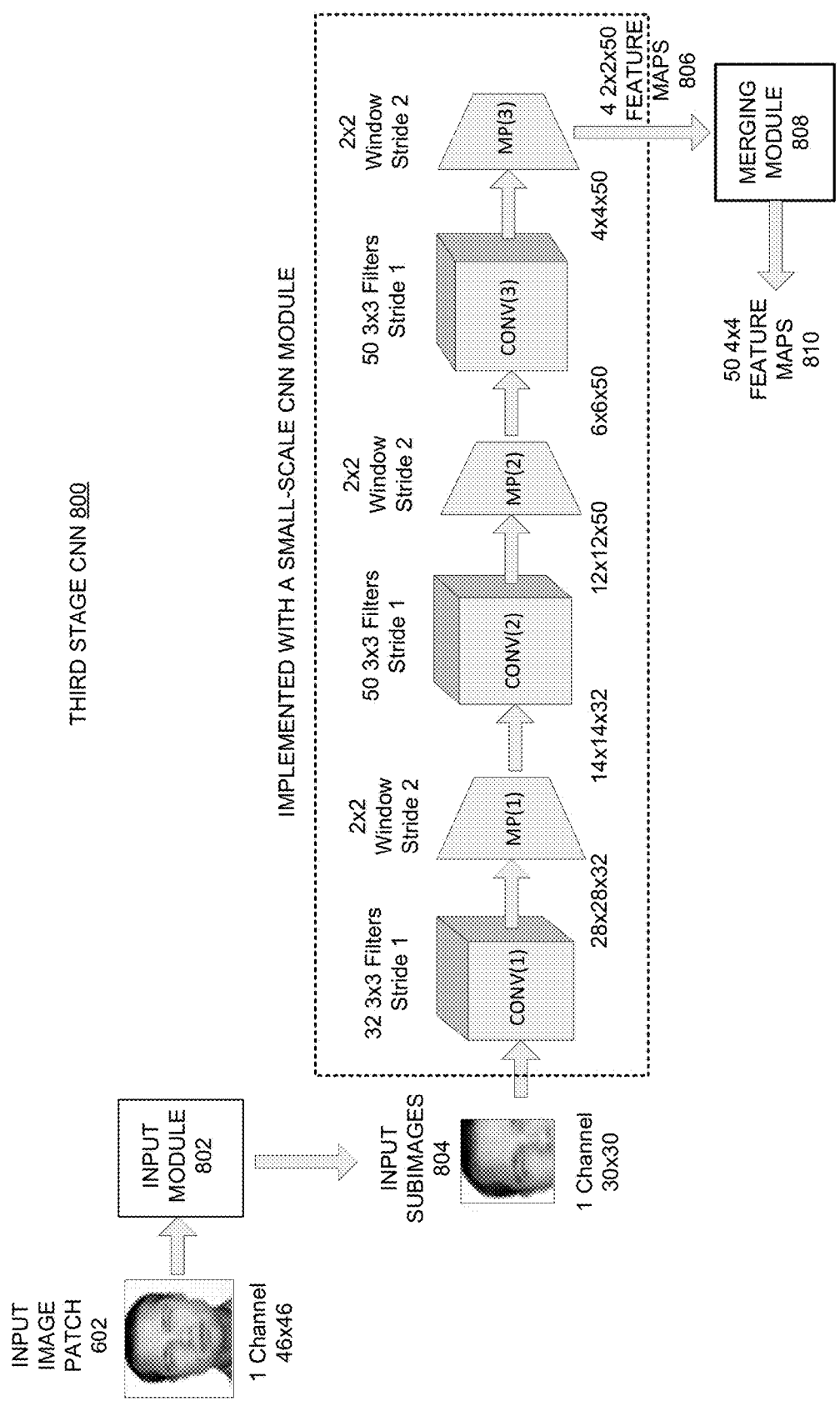
FIG. 8 shows a block diagram of an exemplary implementation of the third stage CNN shown in FIG. 3 based on a small-scale hardware CNN module in accordance with some embodiments described herein.

FIG. 8 shows a block diagram of an exemplary implementation 800 of third stage CNN 312 based on a small-scale hardware CNN module in accordance with some embodiments described herein. As can be seen in FIG. 8, third stage CNN 800 also includes three stages of CONV and MP layers (i.e., CONV(1)/MP(1), CONV(2)/MP(2) and CONV(3)/MP(3)) whose parameters are identical to those in the corresponding CONV and MP layers in third stage CNN 600. Third stage CNN 800 also includes an input module 802 which receives the 46×46 input image patch 602. Input module 802 is configured to partition image patch 602 into 4 subimages 804 of size 30×30, which is smaller than the maximum input image size supported by the built-in hardware CNN module in Hi3519. More detailed operation of input module 802 is described in the related patent application Ser. No. 15/441,194 (e.g., input module 212 in FIG. 2B), the content of which is incorporated herein by reference.

In some embodiments, the three stages of CONV and MP layers in third stage CNN 800 is configured to process the 4 subimages 804 in a sequential manner. As can be seen in FIG. 8, for a given 30×30 subimage 804 (which is clearly a portion/subimage of the image patch 602), CONV(1) layer includes 32 3×3 filters of stride 1. Hence, the output of CONV(1) layer has a dimension of 28×28×32. The MP(1) layer uses 2×2 pooling windows with a stride of 2. Hence, the output of MP(1) layer has a dimension of 14×14×32. The CONV(2) layer includes 50 3×3 filters of stride 1. Hence, the output of CONV(2) layer has a dimension of 12×12×50. The MP(2) layer uses 2×2 pooling windows with a stride 2. Hence, the output of MP(2) layer has a dimension of 6×6×50. The CONV(3) layer includes 50 3×3 filters of stride 1. Hence, the output of CONV(3) layer has a dimension of 4×4×50. The MP(3) layer uses 2×2 pooling windows with a stride 2. Hence, the output of MP(3) layer has a dimension of 2×2×50, i.e., 50 2×2 feature maps 806. For the set of 4 subimages 804, MP(3) layer generates outputs of 4 sets of 2×2×50 feature maps 806.

As shown in FIG. 8, third stage CNN 800 also includes a merging module 808 which is configured to receive and merge the 4 sets of 2×2×50 feature maps 806 to form the full feature maps of the full input image patch 602, i.e., the input to the third stage CNN 800. More detailed operation of merging module 808 is described in the related patent application Ser. No. 15/441,194 (e.g., merging module 222 in FIG. 2B), the content of which is incorporated herein by reference. As described in the related patent application, the output feature maps associated with the set of 4 subimages 804 have no overlap and no gap between adjacent feature maps corresponding to adjacent subimages, and can be merged directly to generate the same output as that of third stage CNN 600 in FIG. 6 before the first FC layer. The merged result, i.e., the output of third stage CNN 800 is a set of 50 4×4 feature maps 810, one of which is also illustrated on the right side in FIG. 7.

In some embodiments, the built-in hardware CNN in Hi3519 is used to implement the three stages of CONV and MP layers shown in third stage CNN 800. However, the built-in hardware CNN in Hi3519 also includes at least three FC layers. In one embodiment, to accommodate these FC layers required by Hi3519, two dummy FC layers configured with the identity matrix as their matrix parameters are included in third stage CNN 800 (not explicitly shown). Moreover, in Hi3519, there is also a ReLU layer after each FC layer. However, as disclosed in the related patent application, the ReLU layer does not affect the output of the dummy FC layer, because the concatenation of multiple ReLU layers is equivalent to just one ReLU layer.

Note that the input image size of third stage CNN 800 does not have to be 46×46. Other feasible sizes can be used as the input image size of third stage CNN 800, and the requirements for the feasible sizes have been described in the related patent application, the content of which is incorporated herein by reference. For example, another possible input image size to third stage CNN 800 can be 62×62. Using this image size, input image patch 802 can be partitioned into 9 overlapping subimages, each of which has a size of 30×30, and a stride of 16 between neighboring subimages in both horizontal and vertical directions.

Referring back to FIG. 3, if third stage CNN 312 in face detection system 300 is implemented as third stage CNN 800, third stage CNN 312 outputs the set of 50 4×4 feature maps 810, which is the input to final decision module 314. In some embodiments, final decision module 314 includes multiple FC layers configured to operate on the received feature maps and generate final decisions on the input video image 302, shown as face detection decisions 316 in FIG. 3.

Figure 9:
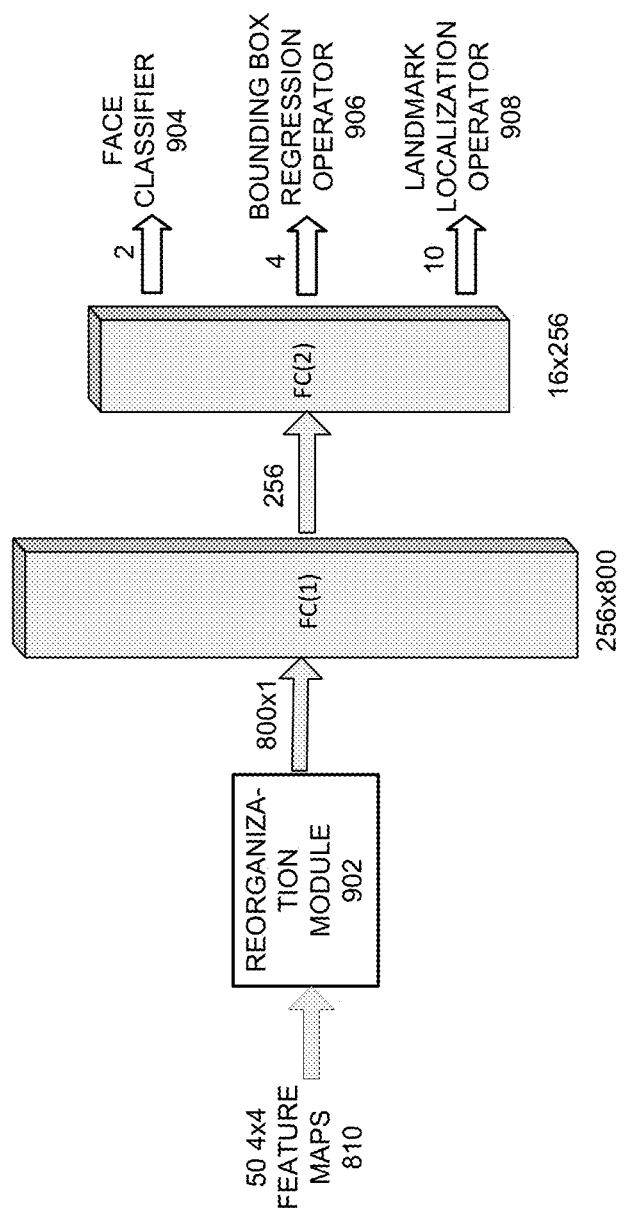
FIG. 9 shows a block diagram of an exemplary implementation of the final decision module shown in FIG. 3 in accordance with some embodiments described herein.

FIG. 9 shows a block diagram of an exemplary implementation 900 of final decision module 314 in accordance with some embodiments described herein. As can be seen in FIG. 9, the set of 50 4×4 feature maps 810 is received and processed by a reorganization module 902, which is configured to merge and reorganize of the set of 2D feature maps into a 1D vector of size 800×1. The 1D vector is further processed by two stages of FC layers FC(1) and FC(2), which subsequently output face detection decisions 316 for a given detected moving area 318. In some embodiments, the final FC layer FC(2) is implemented with a linear classifier such as a softmax classifier. In the embodiment shown, face detection decisions 316 can include face classifier 904, bounding box regression operator 906; and facial landmark localization operator 908. As mentioned above, landmark localization operator 908 within in face detection decisions 316 can include the locations of 5 facial landmark points of the detected face, i.e., left eye, right eye, nose, and two corners of the mouth. While the two FC layers within final decision module 900 have sizes of 256 and 16, respectively, other embodiments of final decision module 314 can have FC layer sizes different from those in final decision module 900. Note that final decision module 900 can be implemented in software and processed by the CPU on Hi3519 SoC, because final decision module 900 has much lower computational complex than each of the three stages of the CNNs 308, 310, and 312.

Figure 10:
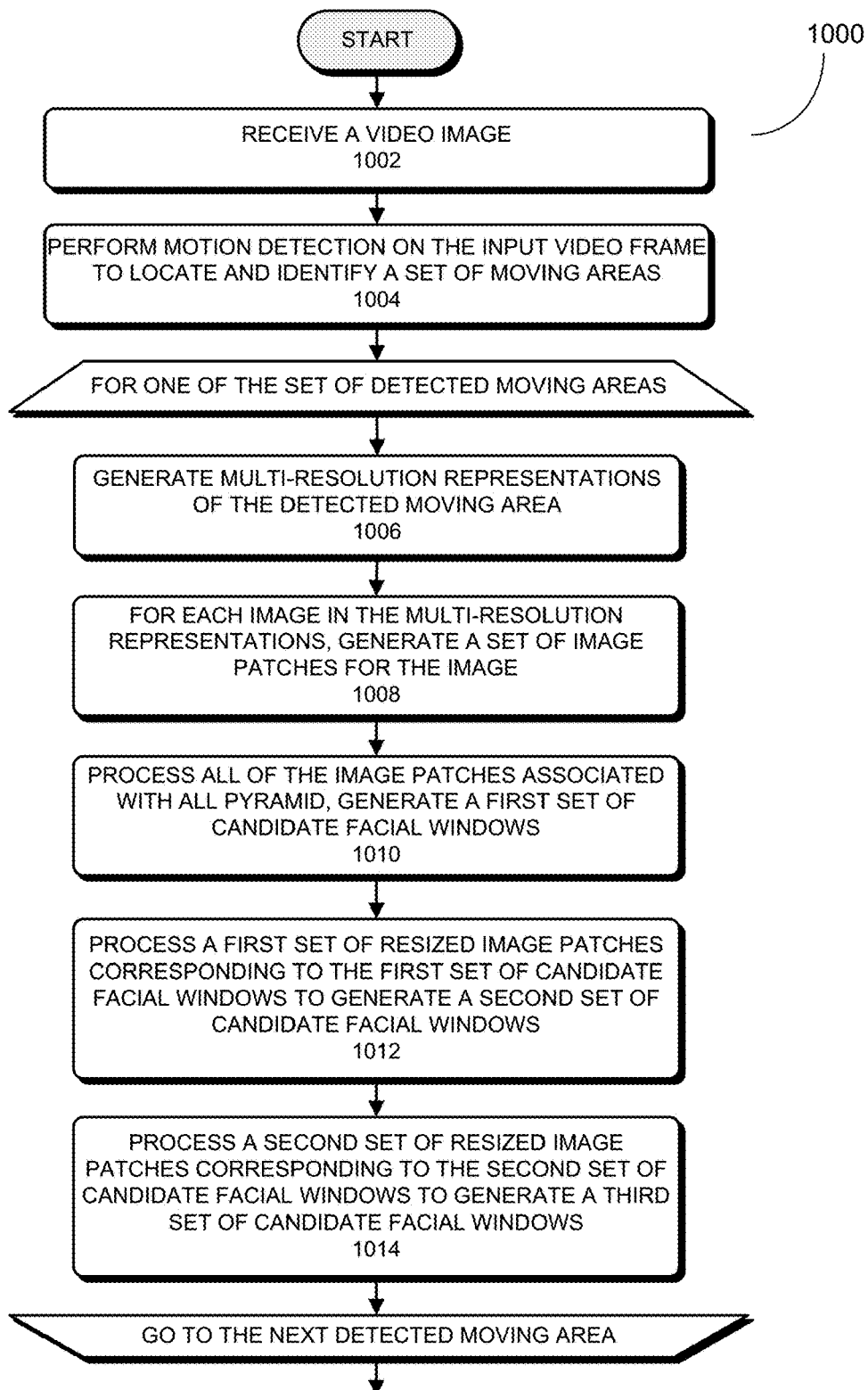
FIG. 10 presents a flowchart illustrating an exemplary face detection process using the disclosed face detection system implemented on a CNN-enabled embedded system in accordance with some embodiments described herein.

FIG. 10 presents a flowchart illustrating an exemplary face detection process 1000 using the disclosed face detection system 300 implemented on a CNN-enabled embedded system in accordance with some embodiments described herein. In some embodiments, the CNN-enabled embedded system includes a small-scale low-cost SoC, such as Hi3519 SoC. The face detection process 1000 begins when a video image/frame is received at the input of the disclosed face detection system (step 1002). In some embodiments, the video image is captured by a high-resolution camera, such as a surveillance camera, a machine vision camera, cameras on a self-drive car, or mobile phone cameras.

Next in face detection process 1000, a motion detection operation is performed on the input video image/frame to locate and identify a set of moving areas (i.e., image patches within the video frame associated with motions) within the video frame (step 1004). In some embodiments, the motion detection operation is implemented with a built-in background subtraction module within the CNN-enabled embedded system to detect those moving areas in the video image/frame. The output from the motion detection operation includes a set of identified moving areas within the video frame. In some embodiments, the motion detection operation is replaced by or combined with a face tracking operation. Note that by combining motion detection and face tracking in face detection process 1000, the face detection speed can be significantly increased. In some embodiments, the motion detection operation can be omitted from face detection process 1000.

Next in face detection process 1000, for each detected moving area, a pyramid generation operation is performed on the detected moving area to generate multi-resolution representations of the detected moving area (step 1006). More specifically, a higher-resolution representation of the detected moving area is to be used to detect smaller faces in the original input video image, while a lower-resolution representation of the detected moving area is to be used to detect larger faces in the original input video image.

Next in face detection process 1000, a sliding window operation is performed on each image in the multi-resolution representations to generate a set of image patches for the image (step 1008). In some embodiments, the size of the sliding window is determined based on a first input size of a first CNN processing stage configured with a first complexity level.

Next in face detection process 1000, the first CNN processing stage is used to process all of the image patches corresponding to each sliding window location within each multi-resolution representation of detected moving area to generate a first set of candidate facial windows (step 1010). In some embodiments, each of the first set of candidate facial windows is associated with a confident score and a set of bounding box coordinates. In some embodiments, each candidate facial window is also associated with 5 facial landmark points, i.e., left eye, right eye, nose, and two corners of the mouth. In some embodiments, the first CNN processing stage is configured to meet the constraints of a small-scale hardware CNN module, such as the built-in hardware CNN module within Hi3519, and therefore can be implemented by the built-in hardware CNN module within Hi3519.

Next in face detection process 1000, a second CNN processing stage is used to process a first set of resized image patches corresponding to the first set of candidate facial windows to generate a second set of candidate facial windows (step 1012). In some embodiments, the second CNN processing stage is configured with a second complexity level higher than the first complexity level. In some embodiments, the size of the first set of resized image patches is equal to a second input size of the second CNN processing stage, wherein the second input size is greater than the first input size of the first CNN processing stage. As a result, the second CNN processing stage processes higher resolution input image patches with higher face detection accuracy than the first CNN processing stage. In some embodiments, each of the second set of candidate facial windows is associated with a confident score and a set of bounding box coordinates. In some embodiments, each candidate facial window is also associated with 5 facial landmark points, i.e., left eye, right eye, nose, and two corners of the mouth. In some embodiments, the second CNN processing stage is configured to meet the constraints of a small-scale hardware CNN module, such as the built-in hardware CNN module within Hi3519, and therefore can be implemented by the built-in hardware CNN module within Hi3519.

Next in face detection process 1000, a third CNN processing stage is used to process a second set of resized image patches corresponding to the second set of candidate facial windows to generate a third set of candidate facial windows (step 1014). In some embodiments, the third CNN processing stage is configured with a third complexity level higher than both the first and the second complexity levels. In some embodiments, the size of the second set of resized image patches is equal to a third input size of the third CNN processing stage, wherein the third input size is greater than both the first and second input sizes of the first and second CNN processing stages. As a result, the third CNN processing stage processes higher resolution input image patches with higher face detection accuracy than both the first and second CNN processing stages. In some embodiments, each of the third set of candidate facial windows is associated with a confident score and a set of bounding box coordinates. In some embodiments, each candidate facial window is also associated with 5 facial landmark points, i.e., left eye, right eye, nose, and two corners of the mouth. Note that steps 1006 to 1014 are repeated for each detected moving area within the original input video frame.

In some embodiments, it is desirable to also implement the third CNN processing stage with a small-scale hardware CNN module, such as the built-in hardware CNN module within Hi3519. However, because the input size of the third CNN processing stage is generally greater than the maximum input size of such a small-scale hardware CNN module, a subimage-based CNN approach has to be used.

Figure 11:
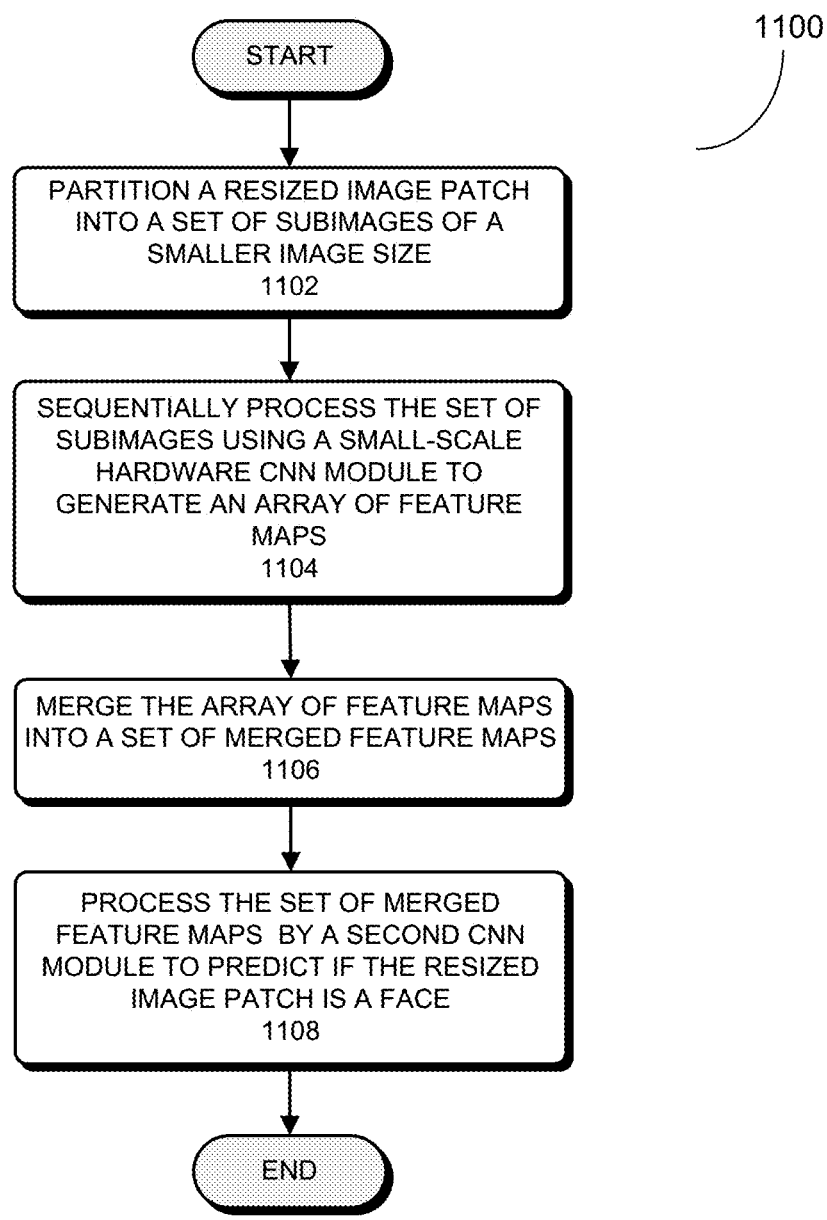
FIG. 11 presents a flowchart illustrating an exemplary process for processing the second set of resized image patches (i.e., step 1014 in FIG. 10) using the disclosed subimage-based CNN system in accordance with some embodiments described herein.

FIG. 11 presents a flowchart illustrating an exemplary process 1100 for processing the second set of resized image patches (i.e., step 1014 in process 1000) using the disclosed subimage-based CNN system in accordance with some embodiments described herein.

To begin, a given resized image patch is partitioned into a set of subimages of a smaller image size (step 1102). In some embodiments, the set of subimages includes a two-dimensional array of overlapping subimages. For example, a 46×46 image patch can be partitioned into a set of 4 overlapping subimages, each having a size of 30×30, and a shift of 16 pixels between neighbouring subimages. Moreover, the size of the subimages is smaller than the maximum input size of the small-scale hardware CNN module, such as the built-in hardware CNN module within Hi3519.

Next, the set of subimages are sequentially processed by the small-scale hardware CNN module to generate an array of feature maps (step 1104). In some embodiments, processing each of the subimages using the small-scale hardware CNN module includes applying multiple stages of CONV layers and MP layers on the subimage.

Next, the array of feature maps output by the small-scale hardware CNN module is merged into a set of merged feature maps (step 1106). More specifically, the set of merged feature maps are identical to the full feature maps for the entire high-resolution resized image patch generated by a large-scale CNN which processes the high-resolution resized image patch as a whole without partitioning the resized image patch. Next, the set of merged feature maps are processed by a second CNN module to predict if the resized image patch is a face (step 1108). In some embodiments, processing the set of merged feature maps includes applying multiple stages of FC layers on the set of merged feature maps.

Note that although various embodiments of the disclosed face detection system described above are directed to applying the subimage-based CNN technique to the last CNN stage of a cascaded CNN system, other embodiments of the disclosed face detection system can also apply the subimage-based CNN technique to more than one stage of a cascaded CNN system, e.g., to the last two stages of the cascaded CNN system.

Joint Face-Detection and Pose-Angle-Estimation CNN Architecture

We have described above, in conjunction with FIGS. 3-11 a face detection system based on using a small-scale hardware CNN module (e.g., the one within Hi3519) and a subimage-based approach to enable processing images having resolutions greater than the maximum input size of the small-scale hardware CNN module. Hence, the above disclosed face detection system can be implemented on resource-limited embedded systems integrated with such small-scale hardware CNN modules.

As mentioned above, it is often desirable to jointly performing face detection and head-pose estimation for some embedded system applications. A number of joint face-detection and head-pose-estimation system have been disclosed. In Zhu et al. ("Face Detection, Pose Estimation, and Landmark Localization in the Wild," CVPR 2012), a unified model for face detection, pose estimation, and landmark estimation was described. In Ranjan et al. ("A Deep Multi-task Learning Framework for Face Detection, Landmark Localization, Pose Estimation, and Gender Recognition," arXiv:1603.01249), a multi-task learning framework for face detection, landmark localization, pose-angle estimation, and gender recognition was developed. However, Zhu uses input images of 150×150 pixels, while Ranjan uses input images of 227×227 pixels and the maximum number of filters in some CONV layers in Ranjan is 384. Unfortunately, the high complexities of these frameworks mean that they are not suitable for implementation on resource-limited low-end embedded systems. Although Ahn et al. ("Real-time Head Orientation from a Monocular Camera using Deep Neural Network," ACCV2014) described a fast pose-angle estimation scheme for low-resolution faces, Ahn's framework does not perform joint face detection and head-pose estimation.

Some embodiments described herein provide a joint face-detection and pose-angle-estimation system and technique based on using a small-scale hardware CNN module such as the built-in CNN module in Hi3519. In some embodiments, the disclosed joint face-detection and pose-angle-estimation system is configured to jointly perform multiple tasks of detecting most or all faces in a sequence of video frames, generating pose-angle estimations for the detected faces, tracking detected faces of a same person across the sequence of video frames, and generating "best pose" estimation for the person being tracked. The disclosed joint face-detection and pose-angle-estimation system can be implemented on resource-limited embedded systems such as smart camera systems that are only integrated with one or more small-scale CNN modules.

In some embodiments, the disclosed joint face-detection and pose-angle-estimation system also uses the above-described coarse-to-fine multi-stage (e.g., three stages) MTCNN architecture, and each of the stages can be implemented with a small-scale CNN module. Moreover, in those stages where the input face image sizes violate the input-size constraint of the small-scale CNN module (e.g., the last stage in a coarse-to-fine three-stage MTCNN), the disclosed joint face-detection and pose-angle-estimation system and technique is configured to apply the above-described sub-image-based technique on those input face images having sizes greater than the maximum number of input pixels supported by the small-scale CNN module.

In some embodiments, using this subimage-based technique in a given stage of the multi-stage MTCNN (e.g., the last stage in a three-stage MTCNN), the disclosed joint face-detection and pose-angle-estimation system can first divide a high-resolution input face image into a set of properly sized subimages with judiciously designed overlaps among neighbouring subimages. Each of the subimages can then be processed with a resource-limited small-scale CNN module, such as the built-in CNN module in Hi3519. The outputs corresponding to the set of subimages can be subsequently merged to obtain the output corresponding to the high-resolution input face image, and the merged output can be further processed by subsequent layers in the given stage of the multi-stage MTCNN. In some embodiments, the given stage using the subimage-based technique can be configured to be equivalent to a corresponding stage in the MTCNN which uses a large-scale CNN to process the entire high-resolution input face image without partitioning, and as such the output of the given stage using the subimage-based technique can be exactly identical to the output of the corresponding stage that does not use the subimage-based technique.

Figure 12:
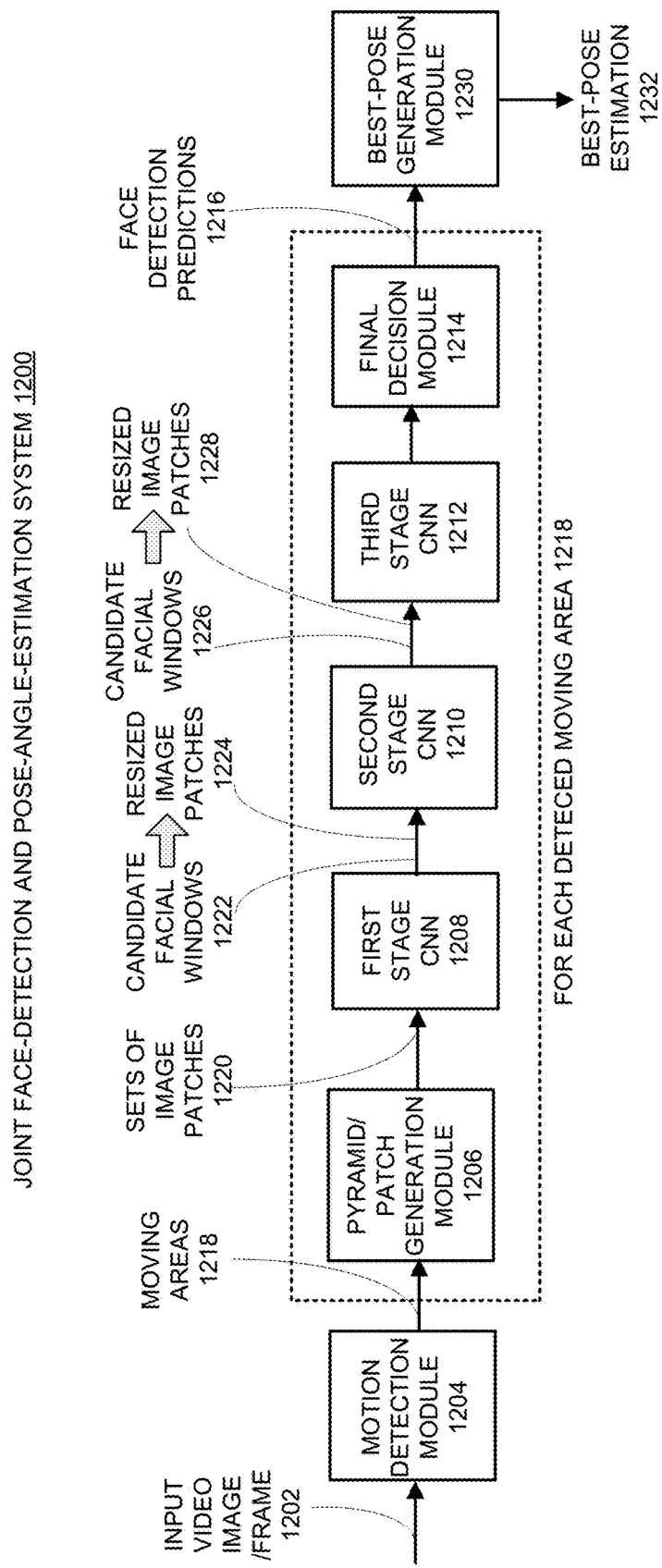
FIG. 12 shows a block diagram of an exemplary joint face-detection and pose-angle-estimation system based on a small-scale hardware CNN module in accordance with some embodiments described herein.

FIG. 12 shows a block diagram of an exemplary joint face-detection and pose-angle-estimation system 1200 based on a small-scale hardware CNN module in accordance with some embodiments described herein. As can be observed in FIG. 12, joint face-detection and pose-angle-estimation system 1200 has substantially the same structure as face detection system 300 in FIG. 3. Moreover, each functional block/module in face-detection and pose-angle-estimation system 1200 can be substantially identical to a corresponding functional block/module in face detection system 300. More specifically, joint face-detection and pose-angle-estimation system 1200 receives a video image/frame 1202 as input and generates face-detection predictions 1216 as output. Like system 300, system 1200 also includes at least a motion detection module 1204, a pyramid and patch generation module 1206, a first stage CNN 1208, a second stage CNN 1210, a third stage CNN 1212 and a final decision module 1214.

In some embodiments, face-detection predictions 1216 can include binary face classifiers, bounding box coordinates, and head-pose estimations. For a specific detected face from an input video image, face-detection predictions 1216 can include a binary face classifier, 4 bounding box coordinates, and 3 head-pose angles (i.e., yaw, pitch and roll). In some embodiments, face-detection predictions 1216 can additionally include facial landmark point locations as described above. In these embodiments, system 1200 can be configured into a multi-task CNN system that jointly performs face detection, head-pose estimations, and facial landmark localizations.

Note that joint face-detection and pose-angle-estimation system 1200 can also include a best-pose-generation module 1230 coupled to the output of final decision module 1214. Although not shown, joint face-detection and pose-angle-estimation system 1200 can additionally include or coupled to a face-tracking module. In some embodiments, the face-tracking module is configured to track the detected faces of a unique person across many video frames and to ensure that these detected faces are labeled with the same person ID. In some embodiments, best-pose-generation module 1230 is coupled to the face-tracking module and receives face-detection predictions 1216 as input. Based on the tracking information from the face-tracking module, best-pose-generation module 1230 can determine the "best pose" and output best-pose-estimation 1232 for a person from many pose-angle-estimations associated with many detected faces of that person in a sequence of video frames.

In some embodiments, the best pose can be defined as a face orientation among many detected faces that has the smallest overall rotation (e.g., based on the sum of the absolution values of the three pose angles) from a full frontal face orientation (i.e., a zero rotation pose). However, other definitions of the best pose different from the above definition can be used. In some embodiments, after determining the best pose for a unique person in a video, best-pose-generation module 1230 is configured to only transmit the detected face image associated with the best pose of that person to the server, thereby reducing transmission bandwidth and storage requirement. In some embodiments, best-pose-generation module 1230 is not part of joint face-detection and pose-angle-estimation system 1200. However, system 1200 can also include additional modules not shown in FIG. 12.

In some embodiments, joint face-detection and pose-angle-estimation system 1200 is implemented on a CNN-enabled embedded system including one or more small-scale CNN modules, such as the built-in CNN module in Hi3519. We now describe each of the blocks in face-detection and pose-angle-estimation system 1200 more detail.

Like motion detection module 304 in system 300, motion detection module 1204 in system 1200 can be used to locate and identify those areas within each video frame which are associated with motions based on comparisons with previously received video frames. The output from motion detection module 1204 includes a set of identified moving areas 1218 which can have different sizes. Each identified moving area 1218, which is a portion of the input video image/frame 1202, is then sent to the subsequent modules within face-detection and pose-angle-estimation system 1200 to detect most or all faces within the moving area and for each detected face within the moving area, and to estimate the head-pose angles. Note that some embodiments of the proposed face-detection and pose-angle-estimation system 1200 can be constructed without a motion detection module 1204.

In some embodiments, motion detection module 1204 can be replaced by or combined with a face-tracking module (not shown) which is configured to compute the trajectories of detected faces by system 1200. More specifically, a face-tracking module can be configured to compute the trajectories based on the face locations in the previous video frames, predict the new locations of the detected faces in a new video frame based on the computed trajectories, and subsequently search these faces in the vicinity of the predicted locations. Note that by combining motion detection and face tracking within face-detection and pose-angle-estimation system 1200, the face detection speed can be significantly increased.

As can be seen in FIG. 12, each of the detected moving areas 1218 generated by motion detection module 1204 (or by a face tracking module, or by a combination of motion detection and face tracking) is processed in a similar manner by the other modules within system 1200, including pyramid and patch generation module 1206, first stage CNN 1208, second stage CNN 1210, the third stage CNN 1212 and the final decision module 1214. Hence, the operations described below associated with pyramid and patch generation module 1206, first stage CNN 1208, second stage CNN 1210, the third stage CNN 1212 and the final decision module 1214 are repeated for each of the detected moving areas 1218. This process iterating over all of the detected moving areas 1218 is indicated by a dashed box placed around these modules. Hence, the following discussion on joint face-detection and pose-angle-estimation system 1200 is directed to and equally applicable to all of the detected moving areas 1218.

Like pyramid and patch generation module 306 in system 300, pyramid and patch generation module 1206 is configured to convert a given moving area 1218 into a "pyramid" of multi-resolution representations of moving area 1218 by downsampling moving area 1218 with different downsampling factors, whereby allowing subsequent face-detection and pose-angle-estimation modules to detect faces of different scales in the given moving area 1218. More specifically, a higher-resolution representation of the given moving area 1218 in the pyramid can be used to detect smaller faces in the original input image/frame 1202, while a lower-resolution representation of moving area 1218 in the pyramid can be used to detect larger faces in the original input image/frame 1202. In some embodiments, each image in the pyramid is further partitioned into a set of image patches based on a user-specified window size, e.g., 16×16, using a sliding window approach.

More specifically, a set of image patches can be generated by stepping a sliding window of user-specified size, e.g., of 16×16 through each image in the pyramid with a user-specified stride, e.g., of 2 or 4 pixels in both row and column directions, such that one image patch is generated at each sliding window location. As a result, pyramid and patch generation module 1206 generates and outputs sets of image patches 1220 of the same size corresponding to the pyramid of multi-resolution representations of the moving area 1218. Note that a higher resolution representation of moving area 1218 can produce significantly more image patches than a lower resolution representation of moving area 1218. Next, the sets of image patches 1220 are received by first stage CNN 1208. Depending on the hardware configuration, first stage CNN 1208 can process the received image patches 1220 in a sequential order one image patch at a time or process multiple image patches in parallel to speed up the processing speed.

First State CNN

Figure 13:
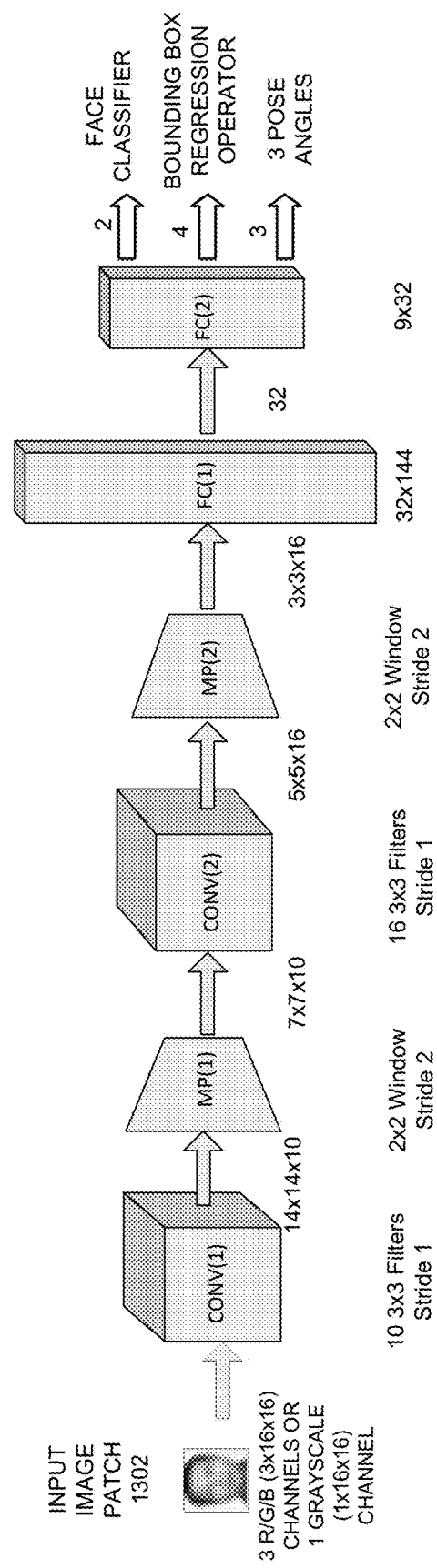
FIG. 13 shows a block diagram of an exemplary implementation of the first stage CNN in the disclosed joint face-detection and pose-angle-estimation system based on a small-scale hardware CNN module in accordance with some embodiments described herein.

First stage CNN 1208 is configured to process each received image patch corresponding to each sliding window location within each pyramid representation of the moving area 1218. FIG. 13 shows a block diagram of an exemplary implementation 1300 of first stage CNN 1208 in the joint face-detection and pose-angle-estimation system 1200 based on a small-scale hardware CNN module in accordance with some embodiments described herein. Note that exemplary first stage CNN 1300 has substantially the same structure as exemplary first stage CNN 400 in FIG. 4, which includes two stages of CONV and MP layers, followed by two FC layers. In some embodiments, each of the CONV and FC layers (except for the last FC layer) is followed by a ReLU layer, which is not shown in FIG. 13. Exemplary first stage CNN 1300 also has substantially the same design parameters in each layer as those corresponding parameters in exemplary first stage CNN 400. The structure and the parameters used by exemplary first stage CNN 1300 meet the constraints of some small-scale hardware CNN module, such as the built-in hardware CNN module within Hi3519, and therefore can be implemented by the built-in hardware CNN module within Hi3519. However, as mentioned above, other implementations of first stage CNN 1208 can have the numbers of layers and filters, filters and pooling window sizes, and FC layer output sizes different from those corresponding values used in the exemplary implementation 1300.

Note that the output of the last FC layer FC(2) of first stage CNN 1300 is a 9×1 vector, which is different from the output of the last FC layer FC(2) of first stage CNN 400, which is a 16×1 vector. In the 9×1 output vector of first stage CNN 1300, the first two outputs are used to generate the face detection confidence score, i.e., the face classifier; the next 4 outputs are the bounding box coordinates of the face in the image patch 1302 (i.e., if the face classifier classifies image patch 1302 as a face); and the last 3 outputs are the estimated values of the three head-pose angles, i.e., yaw, pitch and roll. In some embodiments, the range of each pose-angle-estimation is from −90° to 90°, wherein a full frontal face has all three pose angles of 0°. In some embodiments, the pose-angle estimations in first stage CNN 1300 are only performed during the training stage of the joint face-detection and pose-angle-estimation system 1200 for a subset of training faces associated with relatively large pose angles (sometimes also referred to as "hard poses"). When applying a trained face-detection and pose-angle-estimation system 1200 on new input images for face inferences, the pose-angle estimations in first stage CNN 1300 can be skipped to improve the overall processing speed.

As described above, to eliminate more false alarms in the detected faces by first stage CNN 1208, a filter can be applied to the face detection confidence scores in the detection outputs to only keep those input image patches with face detection confidence scores greater than a threshold values (e.g., a typical threshold value can be set between 0.5~0.7). In some embodiments, this filtering operation is implemented in first stage CNN 1208 after the last FC layer. Furthermore, using the pyramid representation and the sliding window technique can generate many or multiple overlapping but non-identical bounding boxes around each face in the input image. In some embodiments, for each image patch that is classified by first stage CNN 1208 as a face, a corresponding image region in the original input image 1202 is identified. Next, a non-maximum suppression (NMS) technique is used to merge those highly overlapped bounding boxes which are actually associated with the same face. Note that this NMS operation can be performed after the aforementioned filtering operation on the detected faces. Moreover, after the NMS operation, the remaining bounding boxes can be refined through a bounding box regression operation to refine the bounding box locations, as also described in the MTCNN.

Second State CNN

As described above, for each bounding box output from first stage CNN 1208, a corresponding image patch is located and cropped from the original input video image/frame 1202, and the cropped image patch is subsequently resized to another user-specified input size of second stage CNN 1210 which is larger than the input size of first stage CNN 1208. In some embodiments, second stage CNN 1210 is configured with an input size of 24×24. However, other similar sizes (e.g., 32×32) can be used instead of 24×24. Next, each resized image patch 1224 is processed by the second stage CNN 1210, as shown in FIG. 12.

Figure 14:
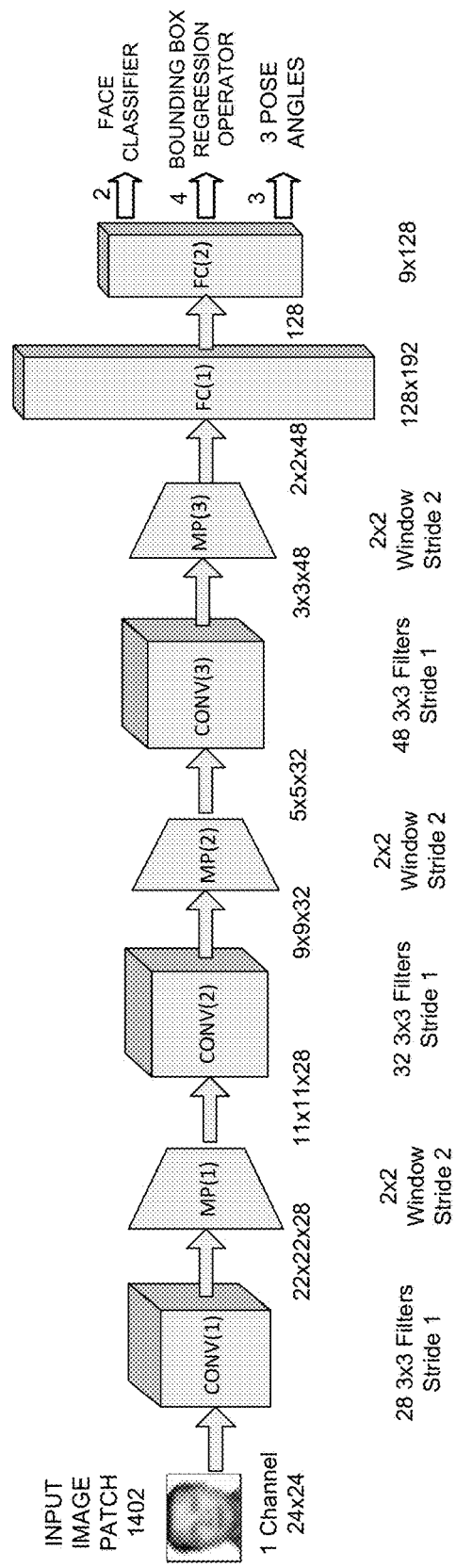
FIG. 14 shows a block diagram of an exemplary implementation of the second stage CNN in the disclosed joint face-detection and pose-angle-estimation system based on a small-scale hardware CNN module in accordance with some embodiments described herein.

FIG. 14 shows a block diagram of an exemplary implementation 1400 of second stage CNN 1210 in the joint face-detection and pose-angle-estimation system 1200 based on a small-scale hardware CNN module in accordance with some embodiments described herein. Note that exemplary second stage CNN 1400 has substantially the same structure as exemplary second stage CNN 500 in FIG. 5, which includes three stages of CONV and MP layers, followed by two FC layers. In some embodiments, each of the CONV and FC layers (except for the last FC layer) is followed by a ReLU layer, which is not shown in FIG. 14. Exemplary second stage CNN 1400 also has substantially the same design parameters in each layer as those corresponding parameters in exemplary second stage CNN 500. However, other implementations of second stage CNN 1210 can have the numbers of layers and filters, filters and pooling window sizes, and FC layer output sizes different from those corresponding values used in the exemplary second stage CNN 1400.

Note that second stage CNN 1400 uses more filters than those in first stage CNN 1300 and the size of the FC layers are also larger than those in first stage CNN 1300. However, the structure and the parameters used by second stage CNN 1400 are still designed to meet the constraints of some small-scale hardware CNN module, such as the built-in hardware CNN module within Hi3519, and therefore can be implemented by the built-in hardware CNN module within Hi3519. Note also that the input to second stage CNN 1400 is a single channel of grayscale image of size 24×24×1, instead of an RGB image of size 24×24×3, because the maximum input size supported by Hi3519 is 1280. However, experimental results show that the performance impact of using grayscale image in second stage CNN 1210 instead of color image is insignificant.

Note that the output of the last FC layer FC(2) of second stage CNN 1400 is also a 9×1 vector including the face classifier, the bounding box coordinates of the face in the image patch 1402 (i.e., if the face classifier classifies image patch 1402 as a face), and the three head-pose angles. However, because the input image resolution in second stage CNN 1400 is higher than the input image resolution in first stage CNN 1300, and CNN 1400 is more powerful and complex than CNN 1300, the face detection accuracy of second stage CNN 1400 is also higher than the accuracy of first stage CNN 1300. In some embodiments, the pose-angle estimations in second stage CNN 1400 are only performed during the training stage of the joint face-detection and pose-angle-estimation system 1200 for a subset of training faces associated with relatively large pose angles. Similarly to the above-described exemplary use of first stage CNN 1300, when applying a trained face-detection and pose-angle-estimation system 1200 on new input images for face inferences, the pose-angle estimations in second stage CNN 1400 can also be skipped to improve the overall processing speed.

Similarly to the post-processing steps used on the outputs of first stage CNN 1300, confidence score threshold and NMS techniques can be used to reject most of the candidate facial windows generated by second stage CNN 1400, and merge those highly overlapped bounding boxes which are actually associated with the same face. Moreover, after the NMS operation, the remaining candidate facial windows can be refined through a bounding box regression operation to refine the candidate facial window locations.

Third State CNN

As described above, for each candidate facial window output from second stage CNN 1210, a corresponding image patch is located and cropped from the original input video image/frame 1202, and the cropped image patch is subsequently resized into resized image patch 1228 having the third user-specified input size which is larger than the input sizes of both the first stage and second stage CNNs 1208 and 1210 for the best performance among the three stages. In some embodiments, the third user-specified input size is 46×46. However, other feasible sizes with sufficient high resolution can be used instead of 46×46.

Figure 15:
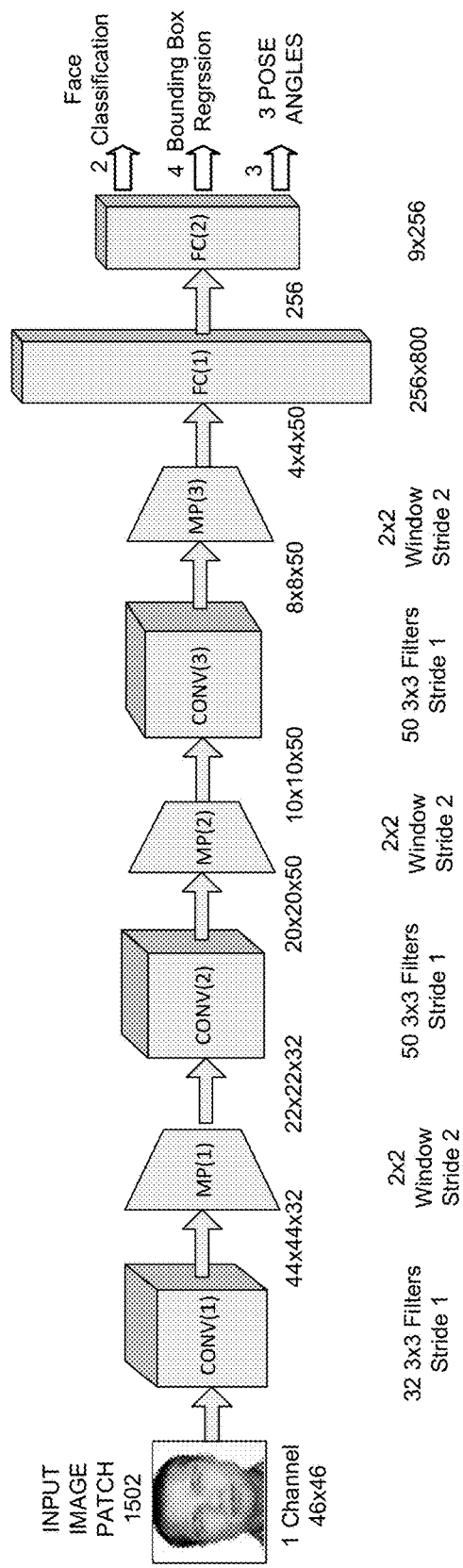
FIG. 15 shows a block diagram of a conceptual implementation of the third stage CNN in the disclosed joint face-detection and pose-angle-estimation system in accordance with some embodiments described herein.

Conceptually, third stage CNN 1212 should process the resized input image patches 1228 in a similar manner to in first stage CNN 1208 and second stage CNN 1210. For example, FIG. 15 shows a block diagram of a conceptual implementation 1500 of third stage CNN 1212 in the joint face-detection and pose-angle-estimation system 1200 in accordance with some embodiments described herein. Note that conceptual third stage CNN 1500 has substantially the same structure as third stage CNN 600 in FIG. 6, which includes three stages of CONY and MP layers, followed by two FC layers. In some embodiments, each of the CONV and FC layers (except for the last FC layer) is followed by a ReLU layer, which is not shown in FIG. 15. Conceptual third stage CNN 1500 also has substantially the same design parameters in each layer as those corresponding parameters in third stage CNN 600. However, other implementations of third stage CNN 1212 can have the numbers of layers and filters, filters and pooling window sizes, and FC layer output sizes different from those corresponding values used in the exemplary implementation 1500. Note also that third stage CNN 1500 uses more filters than those in the first stage and second stage CNNs 1300 and 1400 and the size of the FC layers are also larger than those in the first stage and second stage CNNs.

Note that the input image patch 1502 to third stage CNN 1500 (i.e., one of the resized image patches 1228 in FIG. 12) has a size of 46×46×1=2116 (i.e., only a single channel of grayscale image is used) and it is necessary that the maximum input size of third stage CNN 1500 is equal to or greater than 2116. However, for some small-scale CNN modules such as the built-in hardware CNN module in Hi3519, input image patch 1502 is larger than the maximum input sizes supported by these small-scale CNN modules (e.g., 1280 pixels for Hi3519). Hence, if third stage CNN 1212 in the joint face-detection and pose-angle-estimation system 1200 is to be implemented with such small-scale CNN modules as the built-in hardware CNN module in Hi3519, the conceptual third stage CNN 1500 can only be used during the design stage to optimize the network parameters, but cannot be used to implement third stage CNN 1212 in the final implementation.

Figure 16:
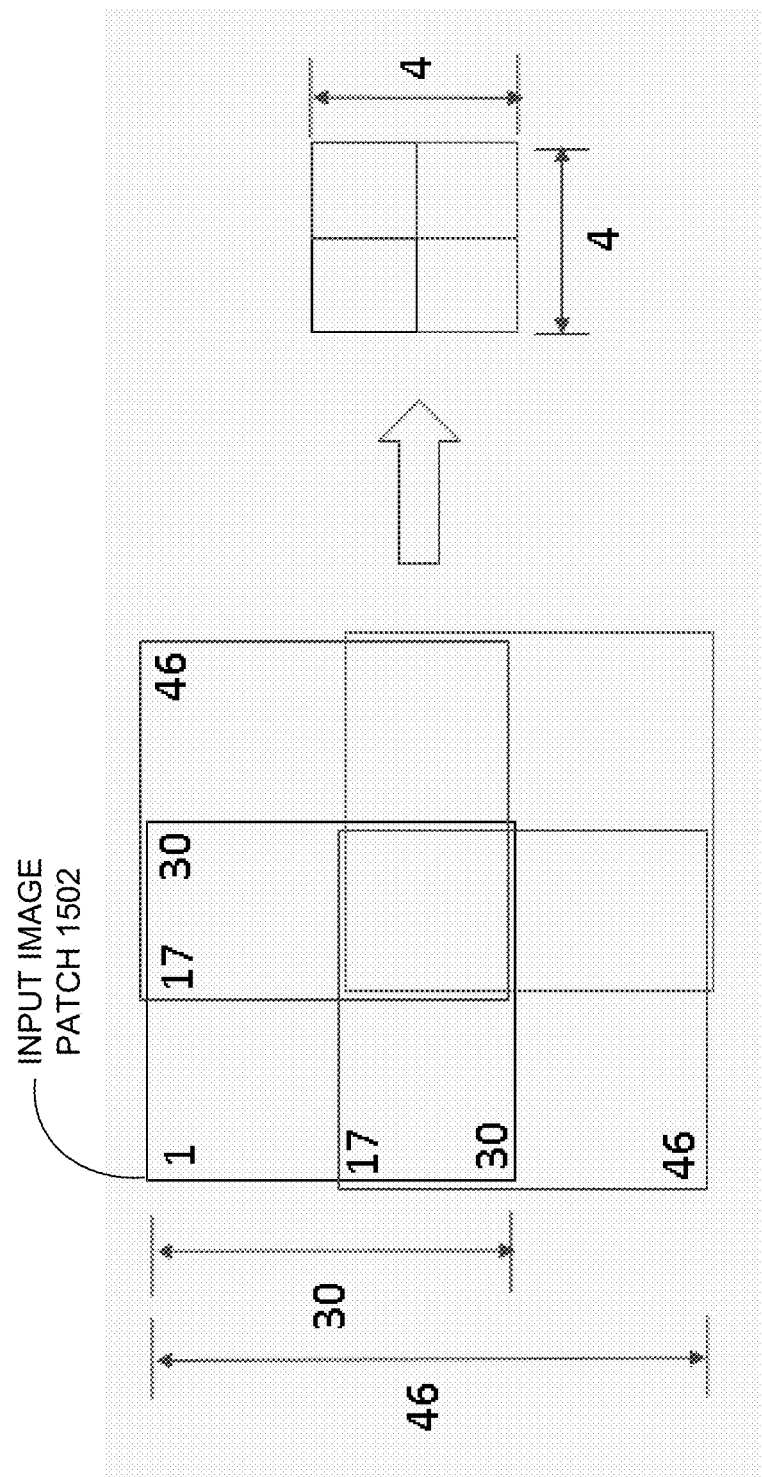
FIG. 16 shows an exemplary input image partition scheme for a 46×46 image patch in accordance with some embodiments described herein.

To resolve the above-described problem, the subimage-based CNN system and technique described in the related patent application Ser. No. 15/441,194 and 15/657,109 can be used. More specifically, using the subimage-based CNN system and technique, the input image patch 1502 can be partitioned into 4 overlapping subimages. For example, FIG. 16 shows an exemplary input image partition scheme for the 46×46 image patch 1502 in accordance with some embodiments described herein. As can be seen on the left side in FIG. 16, input image patch 1502 is partitioned into a set of 4 overlapping subimages or patches, each having a size of 30×30, and there is a shift or a stride of 16 pixels between adjacent subimages. To better visualize the four subimages, small artificial offsets are used to slightly shift the four subimages from their overlapping configuration so that they can be better visualized and more easily distinguished from one another. However, these artificial offsets are only used for the purpose of visualizing these overlapping subimages and should not be construed as actual offsets between these subimages in an implementation. As described above, the specific values of input image size of 46×46, the subimage size of 30×30, and the stride of 16 are all designed based on the partition criteria described in the related patent application Ser. No. 15/441,194 to ensure that the merged outputs from the individual outputs of the 4 subimages are equivalent to the output from third stage CNN 1500 if the entire input image patch 1502 is processed by third stage CNN 1500 as a whole without using the subimage-based CNN technique. However, in some embodiments, one or more of the input image size, the subimage size, and the stride can be different from the partition criteria described in the related patent application Ser. No. 15/441,194.

Figure 17:
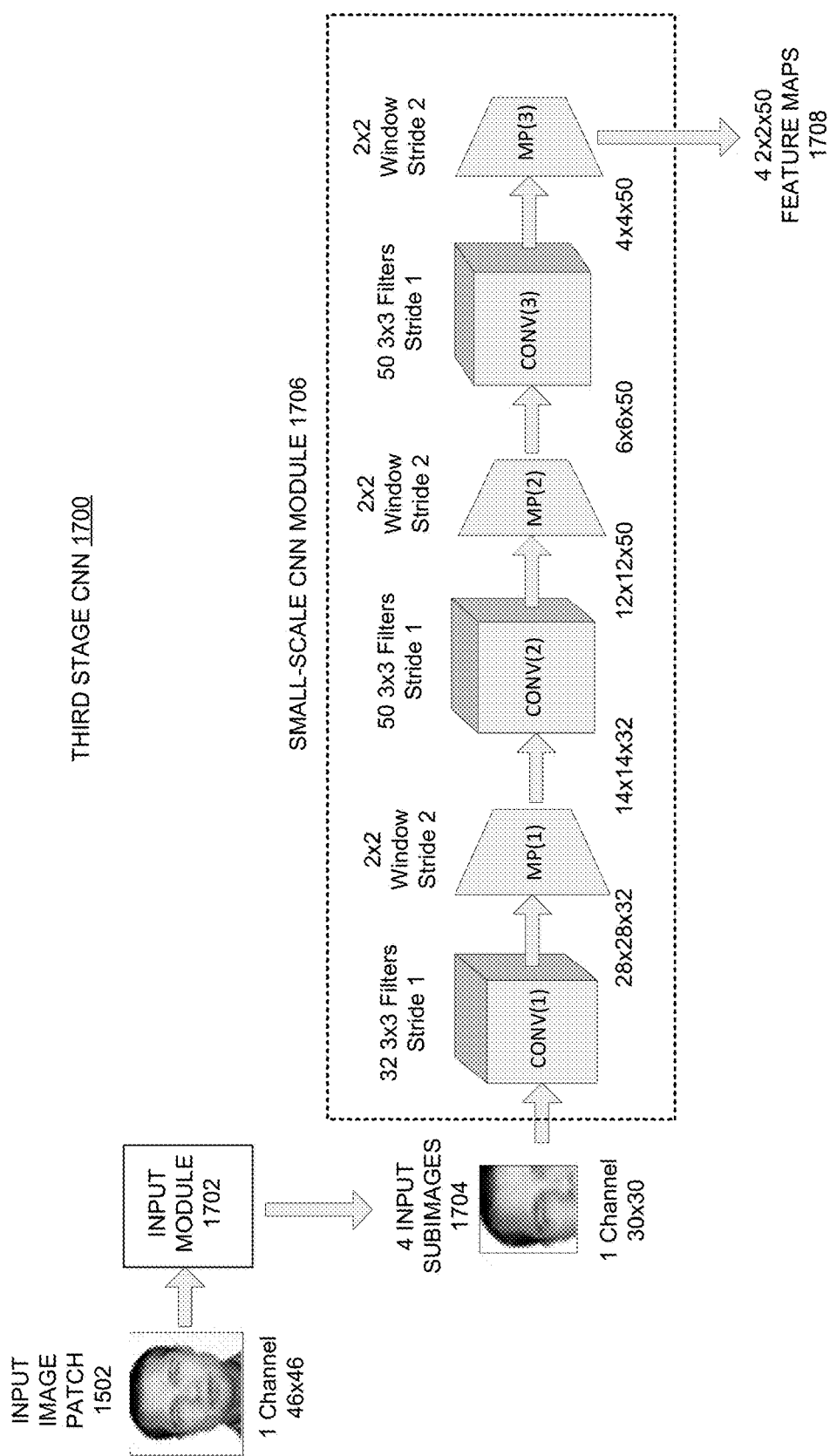
FIG. 17 shows a block diagram of an exemplary implementation of the third stage CNN in the disclosed joint face-detection and pose-angle-estimation system based on a small-scale hardware CNN module in accordance with some embodiments described herein.

FIG. 17 shows a block diagram of an exemplary implementation 1700 of third stage CNN 1212 in the joint face-detection and pose-angle-estimation system 1200 based on a small-scale hardware CNN module in accordance with some embodiments described herein. As can be seen in FIG. 17, third stage CNN 1700 includes an input module 1702 which receives the 46×46 input image patch 1502 and partitions image patch 1502 into 4 subimages 1704 of size 30×30, which is smaller than the maximum input image size supported by the built-in hardware CNN module in Hi3519. Third stage CNN 1700 also includes a small-scale CNN module 1706 composed of three stages of CONV and MP layers whose parameters are identical to those in the corresponding CONV and MP layers in conceptual third stage CNN 1500. Each of the 30×30 subimages 1704 can then be processed by small-scale CNN module 1706, for example, in a sequential manner. The detailed operation of small-scale CNN module 1706 on each subimage 1704 has been described above.

The output from each subimage 1704 includes 50 2×2 feature maps 1708. As described above, the outputs from the 4 subimages have no overlap and no gap, and can be directly merged to obtain the same outputs after the MP(3) layer and before the FC(1) layer in conceptual third stage CNN 1500. In some embodiments, the merged result is a set of 50 4×4 feature maps, one of which is illustrated on the right side in FIG. 16.

Note that the input size of third stage CNN 1700 does not have to be 46×46. Other feasible sizes satisfy the partition criteria described in the related patent application Ser. No. 15/441,194 and 15/657,109 can be used as the input image size of third stage CNN 1700. For example, another possible input image size to third stage CNN 1700 can be 62×62. Using this image size, input image patch 1502 can be partitioned into 9 overlapping subimages, each of which has a size of 30×30, and a stride of 16 between adjacent subimages in both horizontal and vertical directions.

Final Decision

Figure 18:
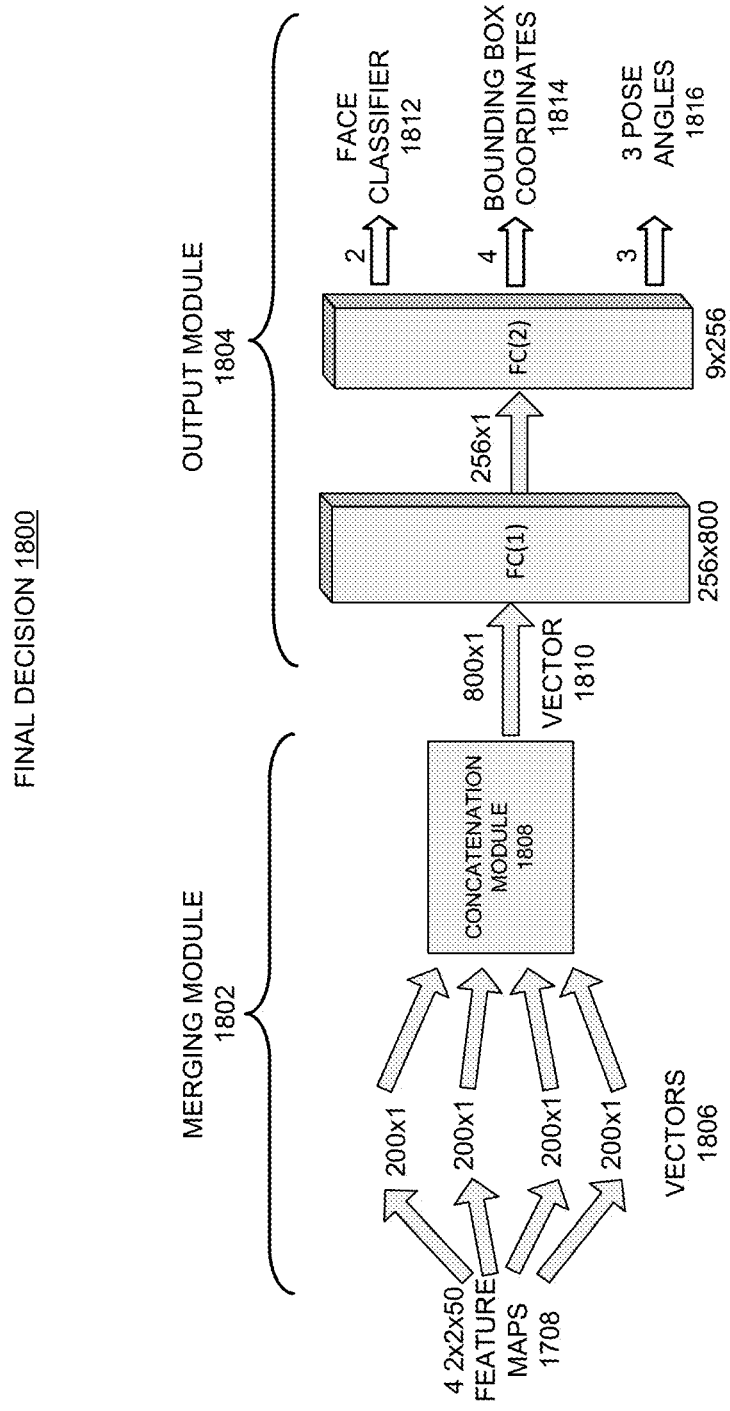
FIG. 18 shows a block diagram of an exemplary implementation of the final decision module in the disclosed joint face-detection and pose-angle-estimation system in accordance with some embodiments described herein.

FIG. 18 shows a block diagram of an exemplary implementation 1800 of final decision module 1214 in the joint face-detection and pose-angle-estimation system 1200 in accordance with some embodiments described herein. As can be seen in FIG. 18, exemplary final decision module 1800 includes a merging module 1802 and an output module 1804. Merging module 1802 is configured to convert the outputs 1708 from third stage CNN 1700 (i.e., 4 2×2×50 feature maps) into four 200×1 vectors 1806. The four vectors 1806 corresponding to the 4 subimages are subsequently merged by concatenation module 1808 to form a one-dimensional (1D) vector 1810 of size 800×1. The 1D vector 1810 is further processed by the two FC layers FC(1) and FC(2) to generate a binary face classifier 1812, 4 bounding box coordinates, and 3 head-pose angles 1816.

Note that merging module 1802 and output module 1804 can be implemented in software and processed by the CPU on Hi3519 SoC, because these operations have much lower computational complex than the convolution operations. In some embodiments, the operations of merging module 1802 and output module 1804 can be further accelerated by the Arm NEON instruction set on Hi3519 SoC. Note that while FC(1) layer is shown to have a size of 256, other FC(1) sizes can used for the proposed joint face-detection and pose-angle-estimation system 1200 without departing from the scope of the present technique.

In some video-based applications, it is required to track a detected person in the video across many video frames using a face-tracking mechanism, and select the best pose of that person from many different poses of the same person. In some embodiments, best-pose-generation module 1230 in joint face-detection and pose-angle-estimation system 1200 is configured to determine the best pose for a unique person based on many pose-angle-estimations associated with many detected faces in different video frames of that person. In some embodiments, the best pose can be defined as a face orientation among many detected faces that has the smallest overall rotation from a full frontal face orientation (i.e., a zero rotation pose). Using the described angle-based pose estimations, the best pose criterion can be expressed as the sum of the absolute values of the three estimated pose angles, i.e., $|\theta_y|+|\theta_p|+|\theta_r|$, wherein $\theta_y$, $\theta_p$, and $\theta_r$ represent the yaw, pitch and roll angles of a detected face. As a result, the best pose can be simply determined as a detected face of the unique person having the smallest value of $|\theta_y|+|\theta_p|+|\theta_r|$ in all the video frames containing the unique person. Note that using the above best pose definition, the disclosed angle-based pose estimation technique provide more simplicity over a facial landmark-based pose estimation technique.

It can be understood that for a multi-stage multi-task CNN system which performs joint face-detection and pose-angle-estimation (and some embodiments can also combine facial landmark localizations in the multi-tasking design), it is advantageous to process high or very-high-resolution input images in the final CNN stage to improve final prediction and decision accuracies. The subimage-based technique allows for processing very large input images in the final CNN stage without concerning the limitations of the hardware CNN module used to implement the final CNN stage

1212. As mentioned above, it is beneficial to jointly perform multiple face detection tasks (e.g., by jointly performing face detection and pose estimation) because doing so can improve face detection accuracy comparing to single task systems. However, multi-task CNN systems would generally require high resolution images for training and for more accurate predictions which in turn requires more complex and expensive CNN architectures. The proposed multi-task CNN systems, such as system 1200 in conjunction with the subimage-based technique have made it possible to performance multiple face detection and face recognition tasks on high resolution images with small-scale low-cost CNN modules and to generate prediction results with accuracies that are equivalent to the results of using much more complex and expensive CNN modules and systems.

Figure 19:
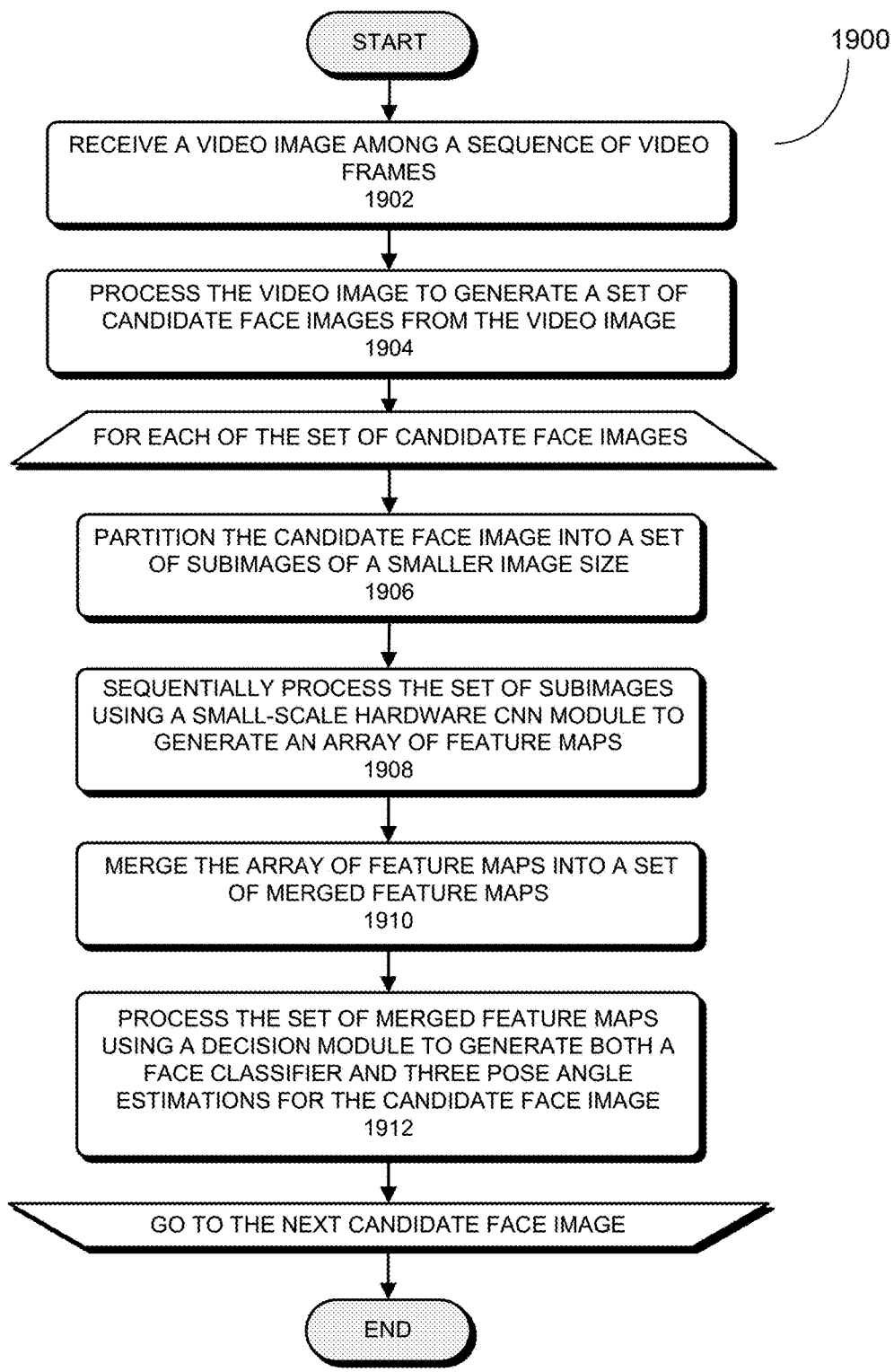
FIG. 19 presents a flowchart illustrating an exemplary process for performing joint face-detection and pose-angle-estimation using the disclosed multi-task CNN system in accordance with some embodiments described herein.

FIG. 19 presents a flowchart illustrating an exemplary process 1900 for performing joint face-detection and pose-angle-estimation using the disclosed multi-task CNN system 1200 in accordance with some embodiments described herein. The process 1900 begins by receiving a video image among a sequence of captured video frames (step 1902). In some embodiments, the set of video frames is captured by a high-resolution camera, such as a surveillance camera, a machine vision camera, cameras on a self-drive car, or mobile phone cameras. Next, process 1900 processes the video image to generate a set of candidate face images from the video image (step 1904). In some embodiments, processing the video image includes using a pyramid multi-resolution representation of the video image and a sliding window approach as described above. In some embodiments, each of the set candidate face images is defined by a bounding box. In some embodiments, the size of each candidate face image is greater than the maximum input size supported by a small-scale hardware CNN module within the multi-task CNN system 1200. Next, for each candidate face image, process 1900 partitions the candidate face image into a set of subimages of a smaller image size (step 1906). More specifically, the size of the set of subimages is smaller than the maximum input image size supported by the small-scale hardware CNN module within the multi-task CNN system 1200. Next, the set of subimages are sequentially processed by the small-scale hardware CNN module to generate an array of feature maps (step 1908). In some embodiments, processing each of the subimages using the small-scale hardware CNN module includes applying multiple stages of CONV layers and MP layers on the subimage.

Next, the array of feature maps output by the small-scale hardware CNN module is merged into a set of merged feature maps (step 1910). More specifically, the set of merged feature maps is identical to the full feature maps generated by a large-scale CNN module which processes the entire input face image without partitioning. Next, the set of merged feature maps are processed by a decision module to generate both a face classifier and three pose-angle estimations for the candidate input face image (step 1912).

Figure 20:
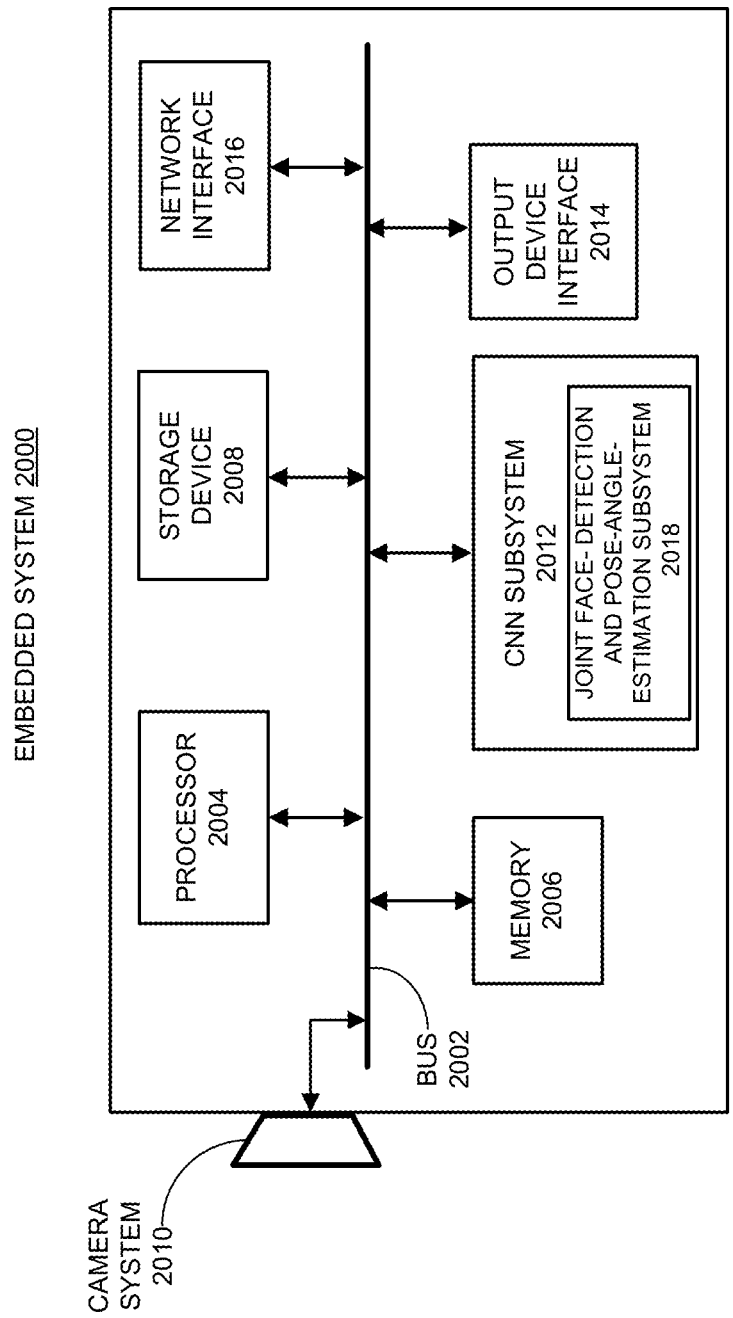
FIG. 20 illustrates an exemplary embedded system within which the disclosed joint face-detection and pose-angle-estimation system is implemented in accordance with some embodiments described herein.

FIG. 20 illustrates an exemplary embedded system 2000 within which the disclosed joint face-detection and pose-angle-estimation system is implemented in accordance with some embodiments described herein. Embedded system 2000 can be integrated with or implemented as a surveillance camera system, a machine vision system, a drone, a robot, or a self-driving car. As can be seen in FIG. 20, embedded system 2000 can include a bus 2002, a processor 2004, a memory 2006, a storage device 2008, a camera system 2010, a CNN subsystem 2012, an output device interface 2014, and a network interface 2016.

Bus 2002 collectively represents all system, peripheral, and chipset buses that communicatively couple the various components of embedded system 2000. For instance, bus 2002 communicatively couples processor 2004 with memory 2006, storage device 2008, camera system 2010, CNN subsystem 2012, output device interface 2014, and network interface 2016.

From memory 2006, processor 2004 retrieves instructions to execute and data to process in order to control various components of embedded system 2000. Processor 2004 can include any type of processor, including, but not limited to, a microprocessor, a mainframe computer, a digital signal processor, a personal organizer, a device controller and a computational engine within an appliance, and any other processor now known or later developed. Furthermore, processor 2004 can include one or more cores. Processor 2004 itself can include a cache that stores code and data for execution by processor 2004.

Memory 2006 can include any type of memory that can store code and data for execution by processor 2004. This includes but not limited to, dynamic random access memory (DRAM), static random access memory (SRAM), flash memory, read only memory (ROM), and any other type of memory now known or later developed.

Storage device 2008 can include any type of non-volatile storage device that can be integrated with embedded system 2000. This includes, but is not limited to, magnetic, optical, and magneto-optical storage devices, as well as storage devices based on flash memory and/or battery-backed up memory.

Bus 2002 is also coupled to camera system 2010. Camera system 2010 is configured to capture still images and/or video images at predetermined resolutions and couple the captured image or video data to various components within embedded system 2000 via bus 2002, such as to memory 2006 for buffering and to CNN subsystem 2012 for DL face-detection and head-pose estimation. Camera system 2010 can include one or more digital cameras. In some embodiments, camera system 2010 includes one or more digital cameras equipped with wide-angle lenses. The captured images by camera system 2010 can have different resolutions including high-resolutions such as at 1280× 720p, 1920×1080p or other high resolutions.

In some embodiments, CNN subsystem 2012 further includes a joint face-detection and pose-angle-estimation subsystem 2018. CNN subsystem 2012 is configured to receive the captured video images, such as captured high-resolution video images via bus 2002, perform aforementioned joint face-detection and head-pose estimation operations on the received video images using joint face-detection and pose-angle-estimation subsystem 2018 to detect faces within each video image and generate head-pose-angle estimations for each detected face. In particular, CNN subsystem 2012 can include one or more small-scale hardware CNN modules. For example, CNN subsystem 2012 can include one or more Hi3519 SoCs, each of which includes both a build-in hardware CNN module and a CPU that can execute software CNN functions. In some embodiments, CNN subsystem 2012 is implemented in accordance with one of the various embodiments of the disclosed face detection system 300 and the disclosed joint face-detection and pose-angle-estimation system 1200 of this disclosure.

Output device interface 2014 which is also coupled to bus 2002, enables for example, the display of the results generated by CNN subsystem 2012. Output devices used with output device interface 2014 include, for example, printers and display devices, such as cathode ray tube displays (CRT), light-emitting diode displays (LED), liquid crystal displays (LCD), organic light-emitting diode displays (OLED), plasma displays, or electronic paper.

Finally, as shown in FIG. 20, bus 2002 also couples embedded system 2000 to a network (not shown) through a network interface 2016. In this manner, embedded system 2000 can be a part of a network (such as a local area network ("LAN"), a wide area network ("WAN"), or an Intranet, or a network of networks, such as the Internet. In some embodiments, CNN subsystem 2012 is configured to send a detected face among multiple detected faces of a given person determined to have the best pose among the multiple detected faces by the joint face-detection and pose-angle-estimation subsystem 2018 to a server through network interface 2016. Any or all components of embedded system 2000 can be used in conjunction with the subject disclosure.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for performing joint face-detection and head-pose-estimation on video images based on using at least one small-scale convolutional neural network (CNN) module having a maximum input size constraint, the method comprising:
  receiving a video image among a sequence of video images;
  detecting a candidate face image patch within the video image, wherein the candidate face image patch has a first image size greater than the maximum input size constraint of the small-scale CNN module;
  partitioning the candidate face image patch into a set of subimages of a second image size smaller than the maximum input size constraint of the small-scale CNN module;
  processing the set of subimages using the small-scale CNN module to generate a set of outputs corresponding to the set of subimages;
  merging the set of outputs into a combined output corresponding to the detected candidate face image patch; and
  processing the combined output to generate a face classifier and a set of head-pose estimations for the detected candidate face image patch, wherein the face classifier classifies the detected candidate face image patch as either a human face or not a human face.

2. The method of claim 1,
wherein prior to partitioning the candidate face image patch into a set of subimages, the method further includes resizing the candidate face image patch into a third image size greater than the maximum input size constraint of the small-scale CNN module, wherein the third image size satisfies a predetermined condition for image partition; and
wherein partitioning the candidate face image patch includes partitioning the resized candidate face image patch into the set of subimages of the second image size.

3. The method of claim 2, wherein resizing the candidate face image patch into the third image size includes:
if the first image size is greater than the third image size, downsampling the candidate face image patch to the third image size; and
if the first image size is smaller than the third image size, upsampling the candidate face image patch to the third image size.

4. The method of claim 1, wherein the set of head-pose estimations includes three head-pose angles associated with the detected human face.

5. The method of claim 4, wherein each of the estimated head-pose angles is between −90° and 90°, and wherein a full frontal face has all of the three head-pose angles of 0°.

6. The method of claim 4, wherein the method further comprises:
detecting a set of face images of a unique person across the sequence of video images;
generating a set of head-pose estimations for each of the set of detected face images of the unique person; and
selecting a best pose based on the sets of head-pose estimations which represents a head-pose associated with the smallest overall rotation from a full frontal orientation of a head; and
transmitting the detected face image associated with the selected best pose of the unique person to a server.

7. The method of claim 6, wherein selecting the best pose based on the sets of head-pose estimations includes:
computing a sum of the absolute values of the three head-pose angles for each set of the head-pose estimations; and
selecting the best pose among the set of detected face images corresponding to the minimum computed sum.

8. The method of claim 6, wherein the method further comprises tracking the detected faces of the unique person across the sequence of video images.

9. The method of claim 1,
wherein an output within the set of outputs is a set of feature maps corresponding to a subimage in the set of subimages;
wherein the combined output includes a merged feature map of sets of features maps corresponding to the set of subimages.

10. The method of claim 9, wherein the merged feature map corresponding to the set of subimages is identical to a full feature map generated by a large-scale CNN module which is configured to process the candidate face image patch as a whole without partitioning.

11. The method of claim 1, wherein processing the combined output to generate the face classifier and the set of head-pose estimations includes using two or more fully-connected layers.

12. A joint face-detection and head-pose-estimation system using at least one small-scale hardware convolutional neural network (CNN) module having a maximum input size constraint, comprising:
a small-scale hardware CNN module configured to:
receive a video image among a sequence of video images;
detect a candidate face image patch within the video image, wherein the candidate face image patch has a first image size greater larger than the maximum input size constraint of the small-scale hardware CNN module;
partition the candidate face image patch into a set of subimages of a second image size smaller than the maximum input size constraint of the small-scale hardware CNN module; and
process the set of subimages to generate a set of outputs corresponding to the set of subimages; and
a processor coupled to the hardware CNN module and configured to:
merge the set of outputs into a combined output corresponding to the detected candidate face image patch; and
process the combined output to generate a face classifier and a set of head-pose estimations for the detected candidate face image patch, wherein the face classifier classifies the detected candidate face image patch as either a human face or not a human face.

13. The joint face-detection and head-pose-estimation system of claim 12, wherein the set of head-pose estimations includes three head-pose angles associated with the detected human face.

14. The joint face-detection and head-pose-estimation system of claim 13, wherein each of the estimated head-pose angles is between −90° and 90°, and wherein a full frontal face has all of the three head-pose angles of 0°.

15. The joint face-detection and head-pose-estimation system of claim 12, wherein the system is further configured to:
detect a set of face images of a unique person across the sequence of video images;
generate a set of head-pose estimations for each of the set of detected face images of the unique person;
select a best pose based on the sets of head-pose estimations which represents a head pose associated with the smallest overall rotation from a full frontal orientation of a head; and
transmit the detected face image associated with the selected best pose of the unique person to a server.

16. The joint face-detection and head-pose-estimation system of claim 15, wherein the system is configured to select the best pose by:
computing a sum of the absolute values of the three head-pose angles for each set of the head-pose estimations; and
selecting the best pose among the set of detected face images corresponding to the minimum computed sum.

17. The joint face-detection and head-pose-estimation system of claim 12, further comprising a tracking module coupled to the small-scale hardware CNN module and configured to track the detected faces of the unique person across the sequence of video images.

18. The joint face-detection and head-pose-estimation system of claim 12, wherein the small-scale CNN module is a hardware CNN module embedded within a chipset or a system on chip (SoC).

19. The joint face-detection and head-pose-estimation system of claim 18, wherein the SoC includes HiSilicon Hi3519 SoC.

20. An embedded system capable of performing joint face-detection and head-pose-estimation on video images, the embedded system comprising:
- a processor;
- a memory coupled to the processor;
- an image capturing device coupled to the processor and the memory and configured to capture a sequence of video images; and
- a joint face-detection and head-pose-estimation subsystem coupled to the image capturing device and including a small-scale CNN module associated with a maximum input size constraint, wherein the joint face-detection and head-pose-estimation subsystem is configured to:
  - receive a video image among the sequence of video images;
  - detect a candidate face image patch within the video image, wherein the candidate face image patch has a first image size greater than the maximum input size constraint of the small-scale CNN module;
  - partition the candidate face image patch into a set of subimages of a second image size smaller than the maximum input size constraint of the small-scale CNN module;
  - process the set of subimages using the small-scale CNN module to generate a set of outputs corresponding to the set of subimages;
  - merge the set of outputs into a combined output corresponding to the detected candidate face image patch; and
- process the combined output to generate a face classifier and a set of head-pose estimations for the detected candidate face image patch, wherein the face classifier classifies the detected candidate face image patch as either a human face or not a human face.

* * * * *